United States Patent [19]

Maruo et al.

[11] Patent Number: 4,999,654
[45] Date of Patent: Mar. 12, 1991

[54] IMAGE FORMING SYSTEM

[75] Inventors: Fumitaka Maruo, Yokohama; Akira Hosoya, Yokosuka, both of Japan

[73] Assignee: Ricoh Company, Ltd., Tokyo, Japan

[21] Appl. No.: 435,629

[22] Filed: Nov. 8, 1989

[30] Foreign Application Priority Data

Nov. 14, 1988 [JP] Japan ................. 63-287142
Nov. 14, 1988 [JP] Japan ................. 63-287143
Aug. 28, 1989 [JP] Japan ................. 1-220779

[51] Int. Cl.⁵ .......................................... G01D 15/14
[52] U.S. Cl. ................................................... 346/160
[58] Field of Search ...................... 346/153.1, 154, 160

[56] References Cited

U.S. PATENT DOCUMENTS 4,698,755 10/1987 Okazaki et al. ............... 346/154 X
4,779,105 10/1988 Thomson et al. ............... 346/154
4,809,025 2/1989 Noguchi .......................... 346/160 X

FOREIGN PATENT DOCUMENTS 0104887 4/1984 European Pat. Off. .

Primary Examiner—Donald A. Griffin
Attorney, Agent, or Firm—Cooper & Dunham

[57] ABSTRACT

An image forming system includes an image processor, a print engine, optional units, and a serial signal line. The print engine includes a device managing a variety of information including data relating to its own status and data relating to status of the otpional units. The variety of information are represented by corresponding codes based on total status of the image forming means and the optional units. Each of the optional units includes a device for managing the aforementioned data relating to its own status, and a device for sending the print engine the data relating to its own status.

6 Claims, 37 Drawing Sheets

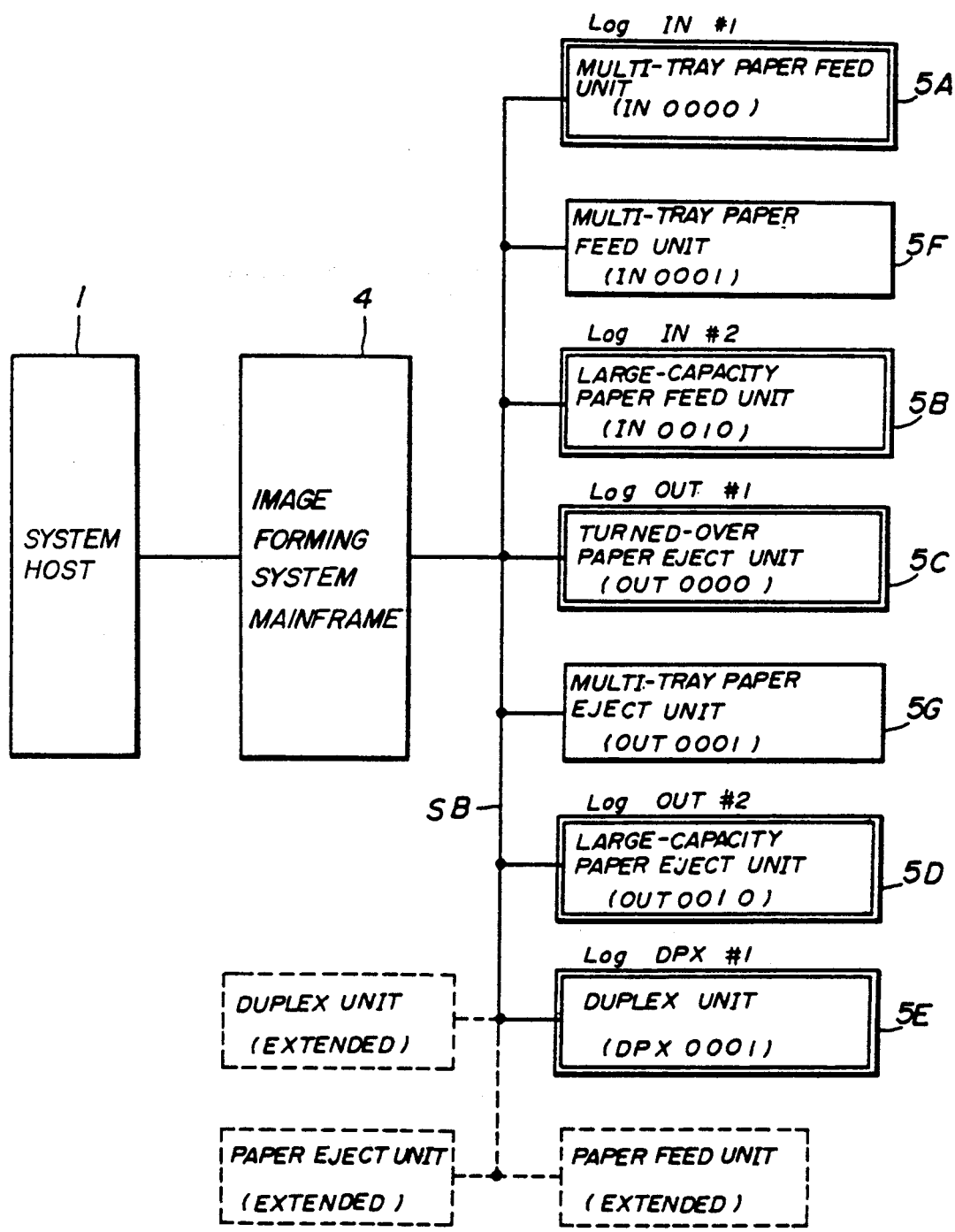

FIG. 10

| NO | a | b | |
|----|------|------|---|
| 1 | GND | GND | ⎫ |
| 2 | GND | GND | ⎪ |
| 3 | GND | GND | ⎬ POWER |
| 4 | +5V | +5V | ⎪ |
| 5 | +5V | +5V | ⎪ |
| 6 | +5V | +5V | ⎭ |
| 7 |  | $\overline{WCLK}$ | ⎫ |
| 8 |  | $\overline{WDATA}$ | ⎪ |
| 9 | GND | GND | ⎬ VIDEO SIGNAL SYSTEM |
| 10 | $\overline{LSYNC}$ | $\overline{LGATE}$ | ⎪ |
| 11 | $\overline{FGATE}$ |  | ⎭ |
| 12 |  |  | |
| 13 | $\overline{PERXD}$ | $\overline{PECTS}$ | ⎫ CONTROL |
| 14 | $\overline{PETXD}$ | $\overline{PEDTR}$ | ⎭ SIGNAL SYSTEM |
| 15 | +5V | +5V | ⎫ |
| 16 | +5V | +5V | ⎪ |
| 17 | +5V | +5V | ⎬ POWER |
| 18 | GND | GND | ⎪ |
| 19 | GND | GND | ⎪ |
| 20 | GND | GND | ⎭ |

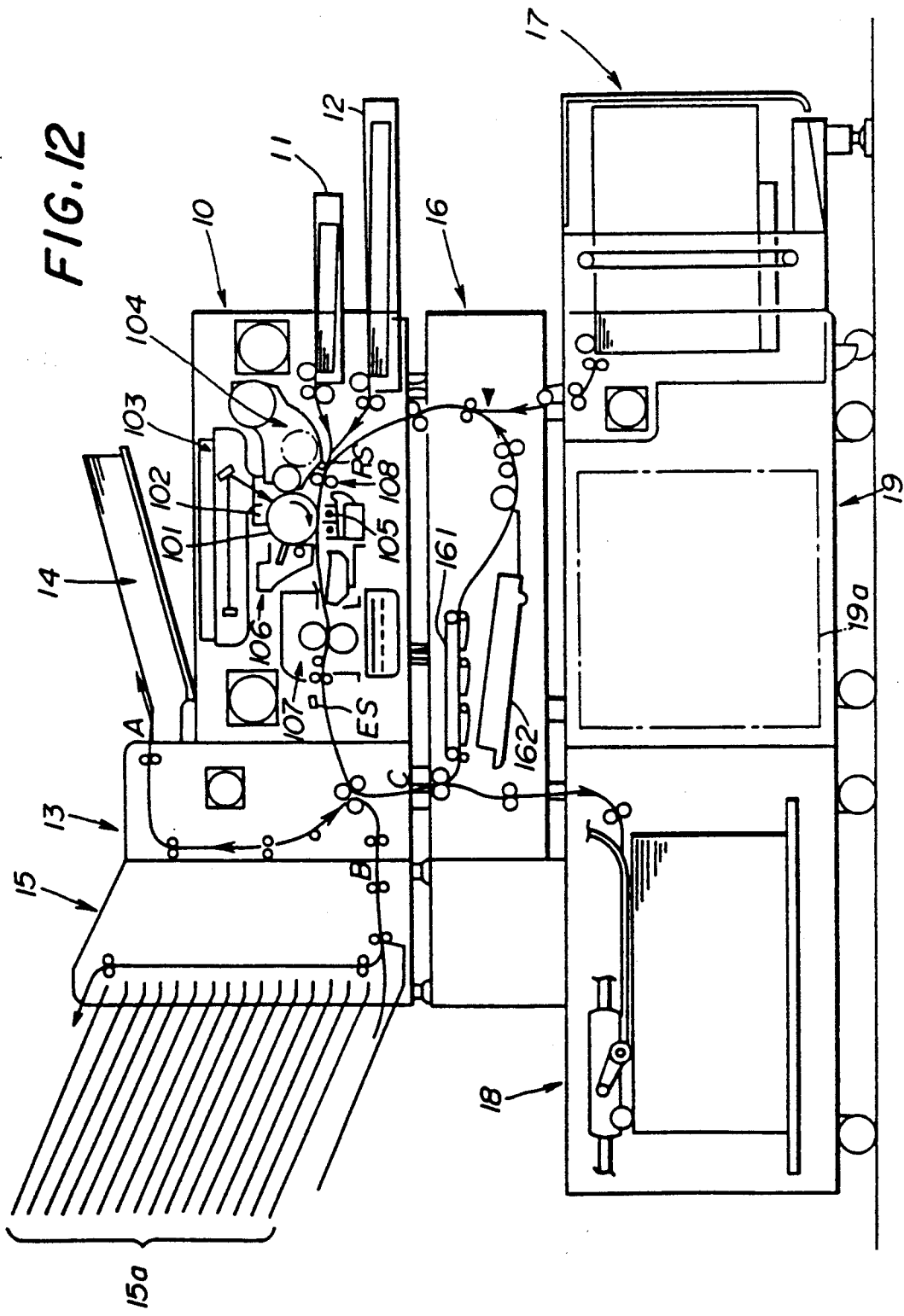

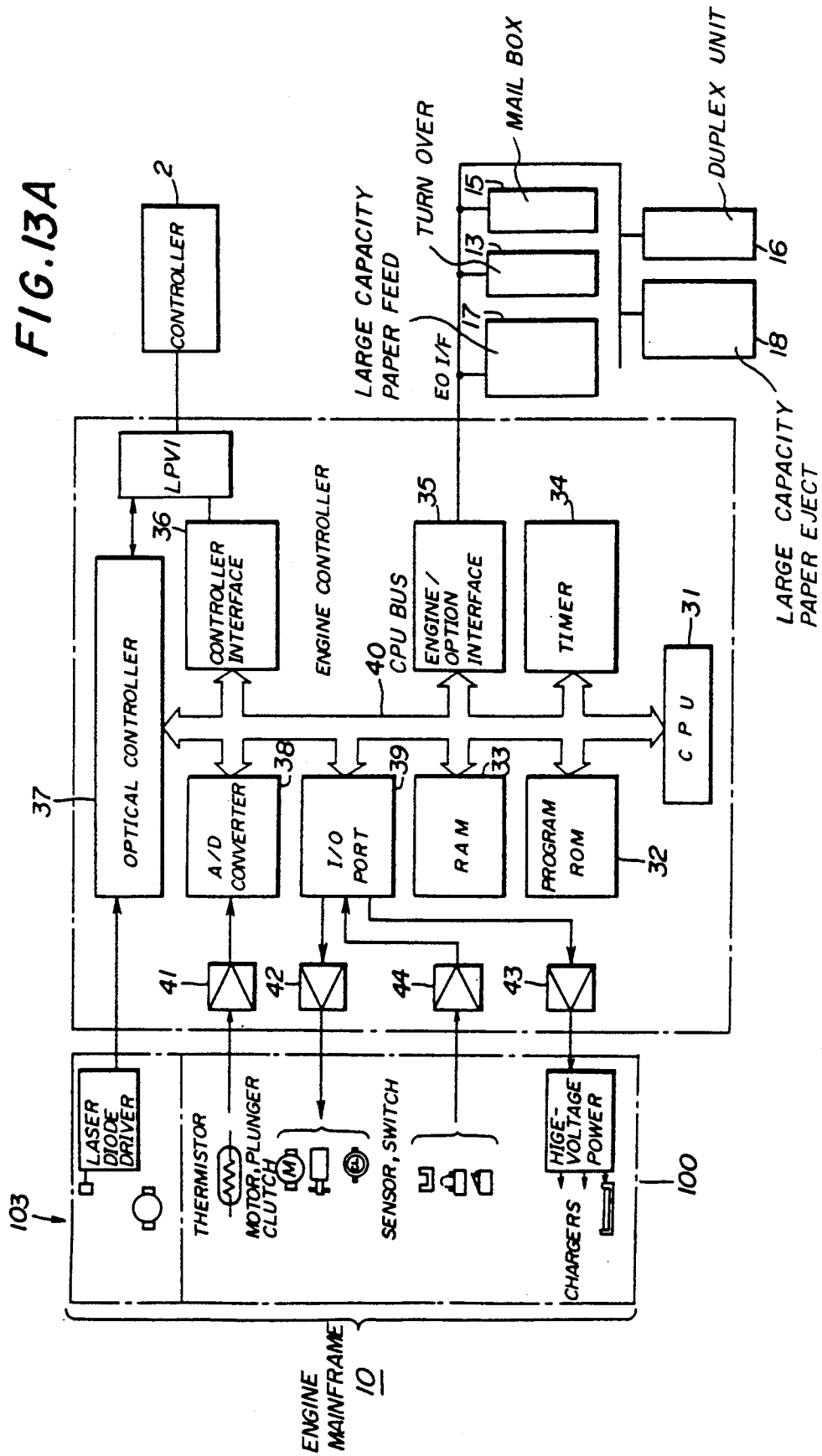

| b7 | b6 | b5 | b4 | b3 | b2 | b1 | b0 |
|----|----|----|----|----|----|----|----|
| 1 | x | x | x | x | x | x | x |

ARGUMENT

FIG. 14b

| b7 | b6 | b5 | b4 | b3 | b2 | b1 | b0 |
|----|----|----|----|----|----|----|----|
| 0 | x | x | x | x | x | x | x |

OPERATOR

FIG. 14c

| b7 | b6 | b5 | b4 | b3 | b2 | b1 | b0 |
|----|----|----|----|----|----|----|----|
| 0 | x | x | x | x | x | x | x |

RESPONSE

FIG. 14d

| b7 | b6 | b5 | b4 | b3 | b2 | b1 | b0 |
|----|----|----|----|----|----|----|----|
| 1 | 1 | 1 | 1 | 1 | 1 | 1 | 1 |

RESPONSE TO ILLEGAL COMMA.

FIG. 14e

| b7 | b6 | b5 | b4 | b3 | b2 | b1 | b0 |
|----|----|----|----|----|----|----|----|
| 1 | x | x | x | x | x | x | x |

EVENT REPORT

| COMMAND | | | | | | | | | RESPONSE | | | | | | | |
|---|---|---|---|---|---|---|---|---|---|---|---|---|---|---|---|---|
| ARGUMENT | | | | | | | | OPERATOR | | | | | | | | |
| b7 | b6 | b5 | b4 | b3 | b2 | b1 | b0 | | b7 | b6 | b5 | b4 | b3 | b2 | b1 | b0 |

FIG. 15a

ASSIGN DEVICE ID  <ENHANCED COMMAND>

| 1 | 1 | 1 | X | DEVICE ID CODE | | | | ***11001 | 0 | LOGICAL ID CODE | | | ASSIGN DEVICE ID CODE | | | |

FIG. 15b

INQUIRE ASSIGNED DEVICE ID  <ENHANCED COMMAND>

| 1 | 1 | 1 | ////// | ////// | ////// | ////// | ////// | ***11010 | 0 | LOGICAL ID CODE | | | ASSIGN DEVICE ID CODE | | | |

FIG. 15c

INQUIRE DEVICE ID  <ENHANCED COMMAND>

| 1 | 1 | 1 | X | DEVICE ID CODE | | | | ***11011 | 0 | UNIT CODE | | | X | ASSIGN DEVICE ID CODE | | |

FIG. 15d

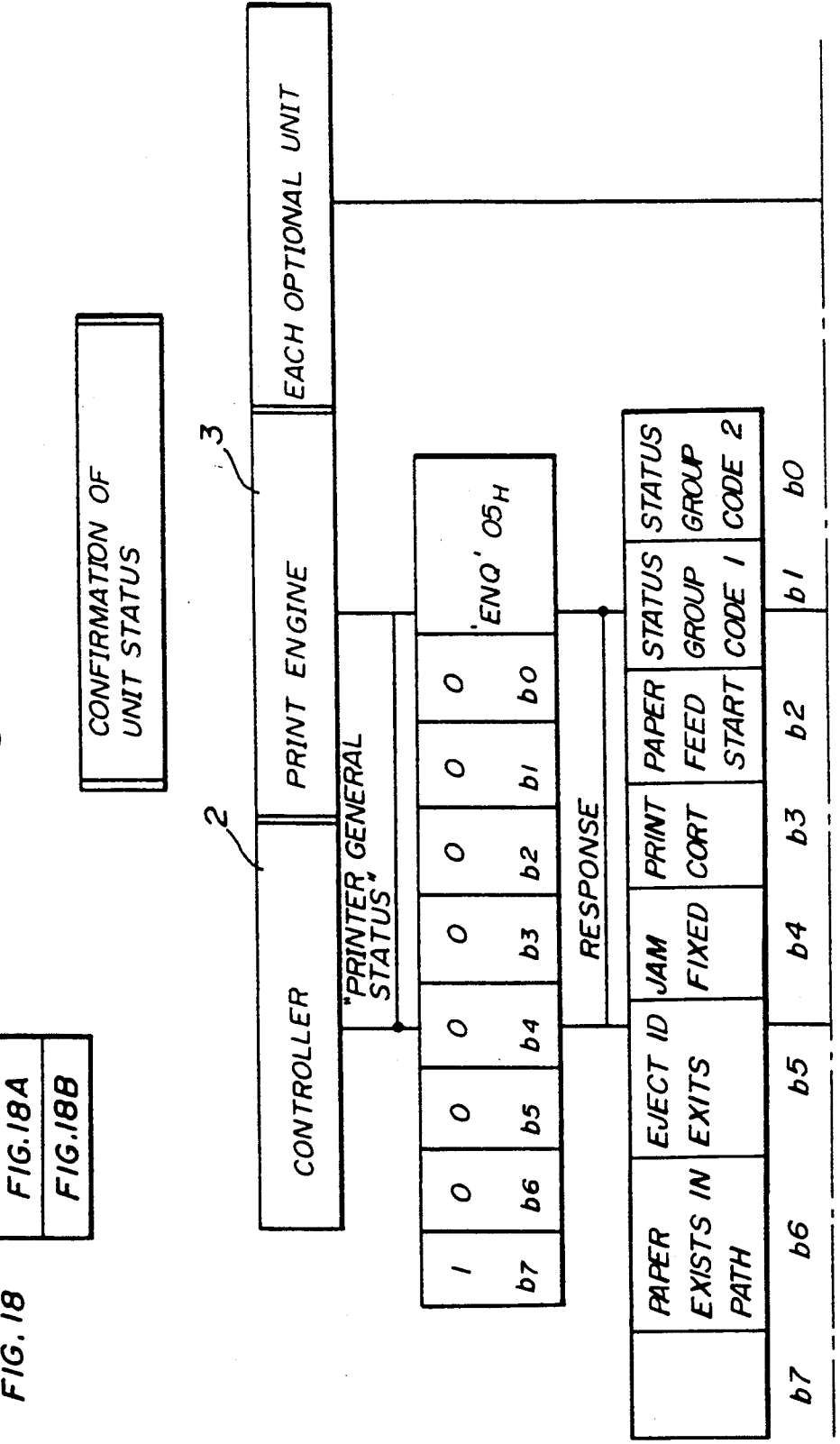

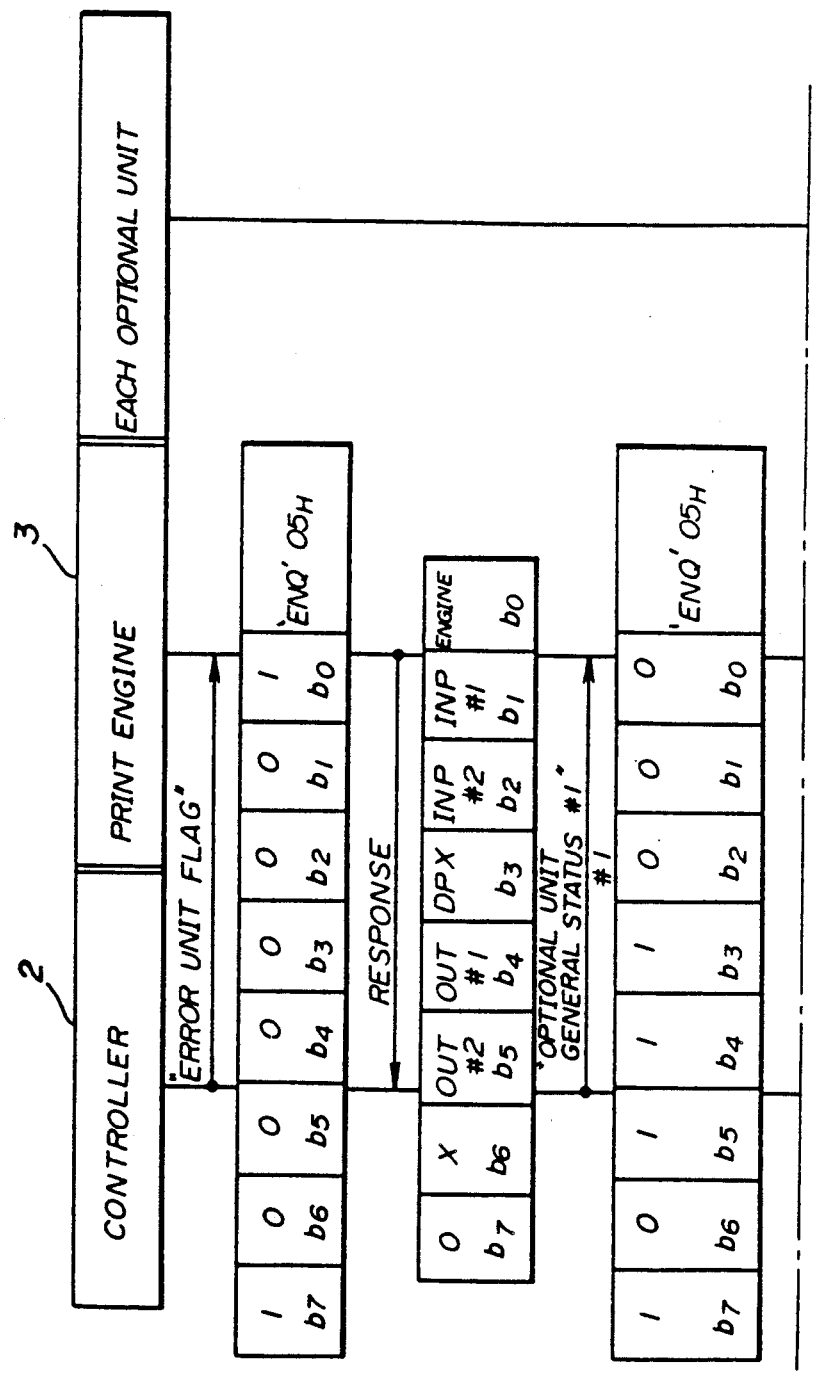

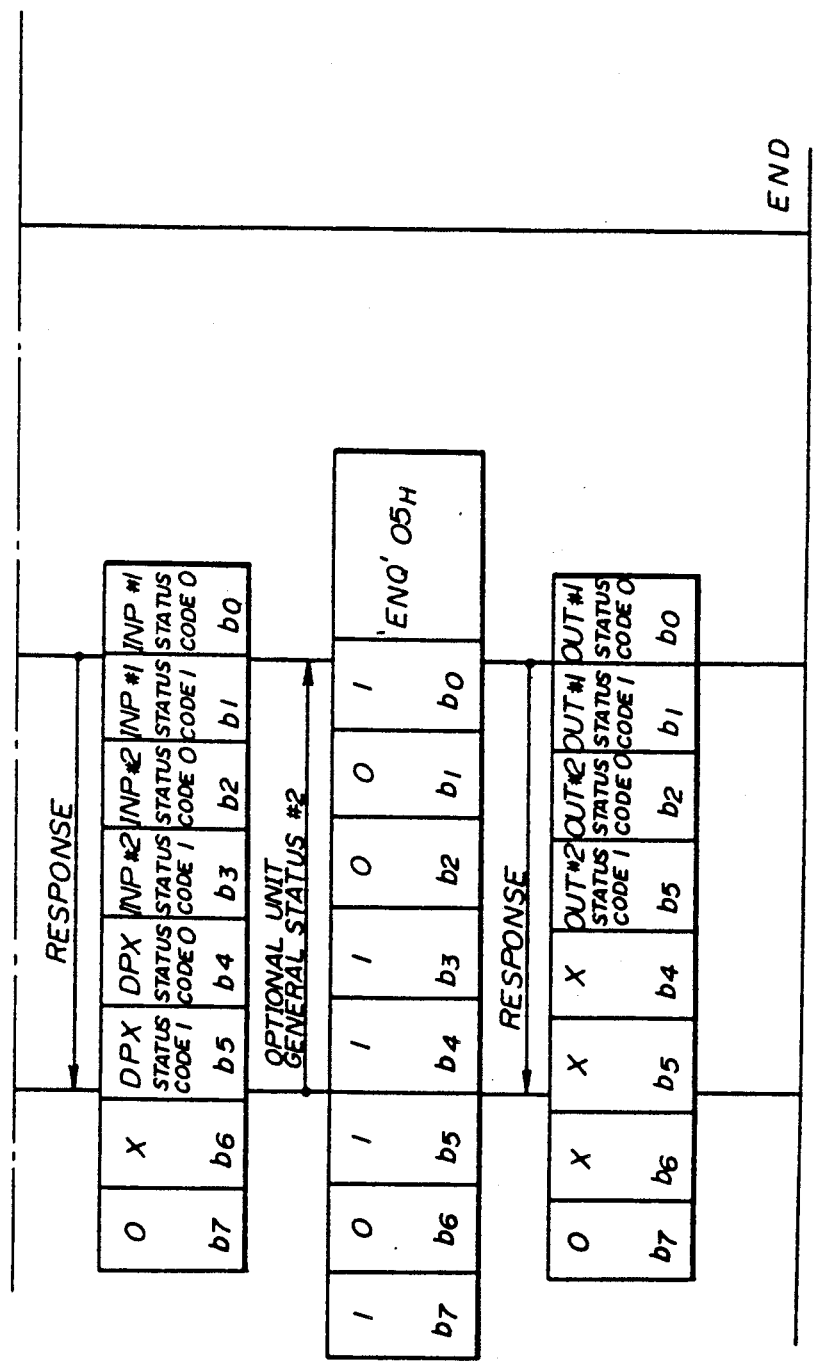

FIG. 21A

| FIG. 21 | FIG.21A |
|---|---|
| | FIG.21B |

| state priority | b5-b0 | status group code | content of status |
|---|---|---|---|
| 64 | 00 0000 | ready | no error (idle, command que buffer is empty) |
| 63 | 00 0001 | ready | reserved |
| 62 | 00 0010 | caution | developer sub-unit replace |
| 61 | 00 0011 | caution | drum replace |
| 60 | 00 0100 | caution | toner add |
| 59 | 00 0101 | caution | cleaning sub-unit replace |
| 58 | 00 0110 | caution | oil add |
| 57 | 00 0111 | caution | command que buffer nearly full |
| 56 | 00 1000 | caution | maintenance request #1 |
| 55 | 00 1001 | caution | maintenance request #2 |
| 54 | 00 1010 | caution | maintenance request #3 |
| 53 | 00 1011 | caution | tray cover open (selected input tray) |
| 52 | 00 1100 | caution | no paper (selected input tray) |
| 51 | 00 1101 | caution | no input tray (selected input tray) |
| 50 | 00 1110 | caution | paper full (selected output tray) |
| 49 | 00 1111 | caution | no output tray or tray cover open (selected output tray) |
| 48 | 01 0000 | busy | reserved |
| 47 | 01 0001 | busy | warming up |
| 46 | 01 0010 | busy | power save mode |
| 45 | 01 0011 | busy | on test printing by engine system itself |
| 44 | 01 0100 | busy | paper size too short |
| 43 | 01 0101 | busy | paper size too long |
| 42 | 01 0110 | busy | waiting for restarting |
| 41 | 01 0111 | busy | reserved |
| 40 | 01 1000 | error (operator) | drum replace (error state) |
| 39 | 01 1001 | error | toner add (error state) |
| 38 | 01 1010 | error | cleaning sub-unit replace (error state) |
| 37 | 01 1011 | error | reserved |
| 36 | 01 1100 | error | reserved |
| 35 | 01 1101 | error | tray cover open (active input tray) |
| 34 | 01 1110 | error | current active paper path is un-appropriate |
| 33 | 01 1111 | error | current active tray is input size mismatch |

FIG. 21B

| state priority | b5–b0 | status group code | content of status |
|---|---|---|---|
| 32 | 10 0000 | error (operator) | no paper (active input tray) |
| 31 | 10 0001 | error | no tray (active input tray) |
| 30 | 10 0010 | error | paper full (active output tray) |
| 29 | 10 0011 | error | no tray or tray cover open (active output tray) |
| 28 | 10 0100 | error | cover open #1 |
| 27 | 10 0101 | error | cover open #2 |
| 26 | 10 0110 | error | cover open #3 |
| 25 | 10 0111 | error | cover open #4 |
| 24 | 10 1000 | error | sub-unit absent #1 (fuser) |
| 23 | 10 1001 | error | sub-unit absent #2 (developer) |
| 22 | 10 1010 | error | sub-unit absent #3 (drum) |
| 21 | 10 1011 | error | sub-unit absent #4 (cleaning) |
| 20 | 10 1100 | error | paper jam #1; mis-feed |
| 19 | 10 1101 | error | paper jam #2; transport jam |
| 18 | 10 1110 | error | paper jam #3; eject jam |
| 17 | 10 1111 | error | paper jam #4 |
| 16 | 11 0000 | error (service) | power supply unit |
| 15 | 11 0001 | error | fuser unit thermistor |
| 14 | 11 0010 | error | fuser unit is too high temp. |
| 13 | 11 0011 | error | fuser unit is too low temp. |
| 12 | 11 0100 | error | drive motor |
| 11 | 11 0101 | error | developer motor |
| 10 | 11 0110 | error | polygonal mirror motor |
| 9 | 11 0111 | error | tray lift motor (any of) |
| 8 | 11 1000 | error | laser diode |
| 7 | 11 1001 | error | photo detector |
| 6 | 11 1010 | error | control board |
| 5 | 11 1011 | error | interlock switch |
| 4 | 11 1100 | error | job motor (any of) |
| 3 | 11 1101 | error | reserved |
| 2 | 11 1110 | error | reserved |
| 1 | 11 1111 | error | reserved |

FIG.22A

| state priority | b5 - b0 | status group code | content of status |
|---|---|---|---|
| 64 | 00 0000 | ready | no error (idle) |
| 63 | 00 0001 | ready | reserved |
| 62 | 00 0010 | caution | reserved |
| 61 | 00 0011 | caution | reserved |
| 60 | 00 0100 | caution | reserved |
| 59 | 00 0101 | caution | reserved |
| 58 | 00 0110 | caution | reserved |
| 57 | 00 0111 | caution | reserved |
| 56 | 00 1000 | caution | reserved |
| 55 | 00 1001 | caution | reserved |
| 54 | 00 1010 | caution | reserved |
| 53 | 00 1011 | caution | tray cover open (selected tray) |
| 52 | 00 1100 | caution | no paper (selected input tray) |
| 51 | 00 1101 | caution | no input tray (selected input tray) |
| 50 | 00 1110 | caution | paper full (selected output tray) |
| 49 | 00 1111 | caution | no output tray (selected output tray) |
| 48 | 01 0000 | busy | reserved |
| 47 | 01 0001 | busy | preparing |
| 46 | 01 0010 | busy | reserved |
| 45 | 01 0011 | busy | reserved |
| 44 | 01 0100 | busy | reserved |
| 43 | 01 0101 | busy | reserved |
| 42 | 01 0110 | busy | reserved |
| 41 | 01 0111 | busy | reserved |
| 40 | 01 1000 | error (operator) | reserved |
| 39 | 01 1001 | error | reserved |
| 38 | 01 1010 | error | reserved |
| 37 | 01 1011 | error | reserved |
| 36 | 01 1100 | error | reserved |
| 35 | 01 1101 | error | reserved |
| 34 | 01 1110 | error | tray cover open (active input tray) |
| 33 | 01 1111 | error | reserved |

FIG.22

| FIG.22A |
|---|
| FIG.22B |

FIG. 22B

| state priority | b5-b0 | status group code | content of status |
|---|---|---|---|
| 32 | 10 0000 | error (operator) | no paper (active input tray) |
| 31 | 10 0001 | error | no tray (active input tray) |
| 30 | 10 0010 | error | paper full (active output tray) |
| 29 | 10 0011 | error | no tray or tray cover open (active output tray) |
| 28 | 10 0100 | error | cover open #1 |
| 27 | 10 0101 | error | cover open #2 |
| 26 | 10 0110 | error | reserved |
| 25 | 10 0111 | error | reserved |
| 24 | 10 1000 | error | communication inactive |
| 23 | 10 1001 | error | reserved |
| 22 | 10 1010 | error | reserved |
| 21 | 10 1011 | error | reserved |
| 20 | 10 1100 | error | paper jam #1 (feed out position) |
| 19 | 10 1101 | error | paper jam #2 (transport position) |
| 18 | 10 1110 | error | paper jam #3 (feed in position) |
| 17 | 10 1111 | error | reserved |
| 16 | 11 0000 | error (service) | power supply unit |
| 15 | 11 0001 | error | reserved |
| 14 | 11 0010 | error | reserved |
| 13 | 11 0011 | error | drive motor |
| 12 | 11 0100 | error | reserved |
| 11 | 11 0101 | error | reserved |
| 10 | 11 0110 | error | tray lift motor (any of) |
| 9 | 11 0111 | error | reserved |
| 8 | 11 1000 | error | reserved |
| 7 | 11 1001 | error | control board error |
| 6 | 11 1010 | error | reserved |
| 5 | 11 1011 | error | reserved |
| 4 | 11 1100 | error | job motor (any of) |
| 3 | 11 1101 | error | reserved |
| 2 | 11 1110 | error | reserved |
| 1 | 11 1111 | error | reserved |

FIG.24

| b1 | b0 | status level | |
|---|---|---|---|
| 0 | 0 | no error | : The engine system is ready to receive commands and execute paper feed and print. |
| 0 | 1 | caution | : The engine system needs adding supply, needs replacement of module, or needs maintenance. Operator's access is necessary. However, it is O.K to execute printing at present. Caution may change to error if no operator access was perfomed. |
| 1 | 0 | busy | : This state may change to no error (ready), caution, or error. Proper time, appropriate operation or issue of corrective command is necessary for clear status. |
| 1 | 1 | error | : The engine system needs operator's recovery action or needs to repair. |

FIG. 25

| Argument of 'ETB' Comand b1 b0 | | contents of Printer General Status indicated with Status group code b1,b0 | Event Report #4 Status group code (b1, b0) transmit timing |
|---|---|---|---|
| 1 | 1 | Status group code is decided by the highest priority status occurring in any part of the engine system. | Whenever any status in any part of the engine system has occurred and whenever cleared. |
| 1 | 0 | Status group code is decided by the highest priority status occurring in selected unit and by the highest priority service man call status occurring in non selected unit. | Whenever any status in selected unit has occurred and whenever cleared also whenever service man call error in non selected unit has occurred and whenever cleared. |
| 0 | 1 | Status group code is decided by the highest priority status occurring in selected unit. | Whenever any status in selected unit has just occurred and whenever cleared. |
| 0 | 0 | Same as "01" | No status changes are reflected on event report #4. |

FIG. 26A

| FIG.26A |
|---------|
| FIG.26B |

FIG. 26

```
SETTING & INQUIRING OF PARAMETERS
     |
1 CONTROLLER ——— 2 PRINT ENGINE ——— 3 EACH OPTIONAL UNIT

EVENT REPORT ENABLE
```

| 1  | EVENT REPORT NO.          | CONDITION | 'ETB' 17H |
|----|---------------------------|-----------|-----------|
| b7 | b6 b5 b4 b3 b2            | b1 b0     |           |

ARGUMENT
EVENT REPORT NUMBER

| b6 b5 b4 b3 b2 | |
|----------------|---|
| 0 0 0 0 0 | PAPER FEED, PRINT EVENT |
| 0 0 0 0 1 | ⎫ |
| 0 0 0 1 0 | ⎬ RESERVED FOR ENHANCEMENT |
| 0 0 0 1 1 | ⎭ |
| 0 0 1 0 0 | *4 GENERAL STATUS GROUP CODE |
| 0 0 1 0 1 | *5 INPUT UNIT #1 STATUS GROUP CODE |
| 0 0 1 1 0 | *6 INPUT UNIT #2 STATUS GROUP CODE |
| 0 0 1 1 1 | *7 DUPLEX UNIT STATUS GROUP CODE |
| 0 1 0 0 0 | *8 OUTPUT UNIT #1 STATUS GROUP CODE |
| 0 1 0 0 1 | *9 OUTPUT UNIT #2 STATUS GROUP CODE |
| 0 1 0 1 0 | ⎫ RESERVED FOR ENHANCEMENT |
| 0 1 0 1 1 | ⎭ |
| 0 1 1 X X | *12 TOP JAMMED PAPER ID |
| 1 0 0 X X | *16 INPUT TRAY PAPER END |
| 1 0 1 X X | *20 OUTPUT TRAY PAPER FULL |
| 1 1 0 X X | *24 EJECTED PAPER ID |
| 1 1 1 X X | *28 CONFIGURATION MODIFY |

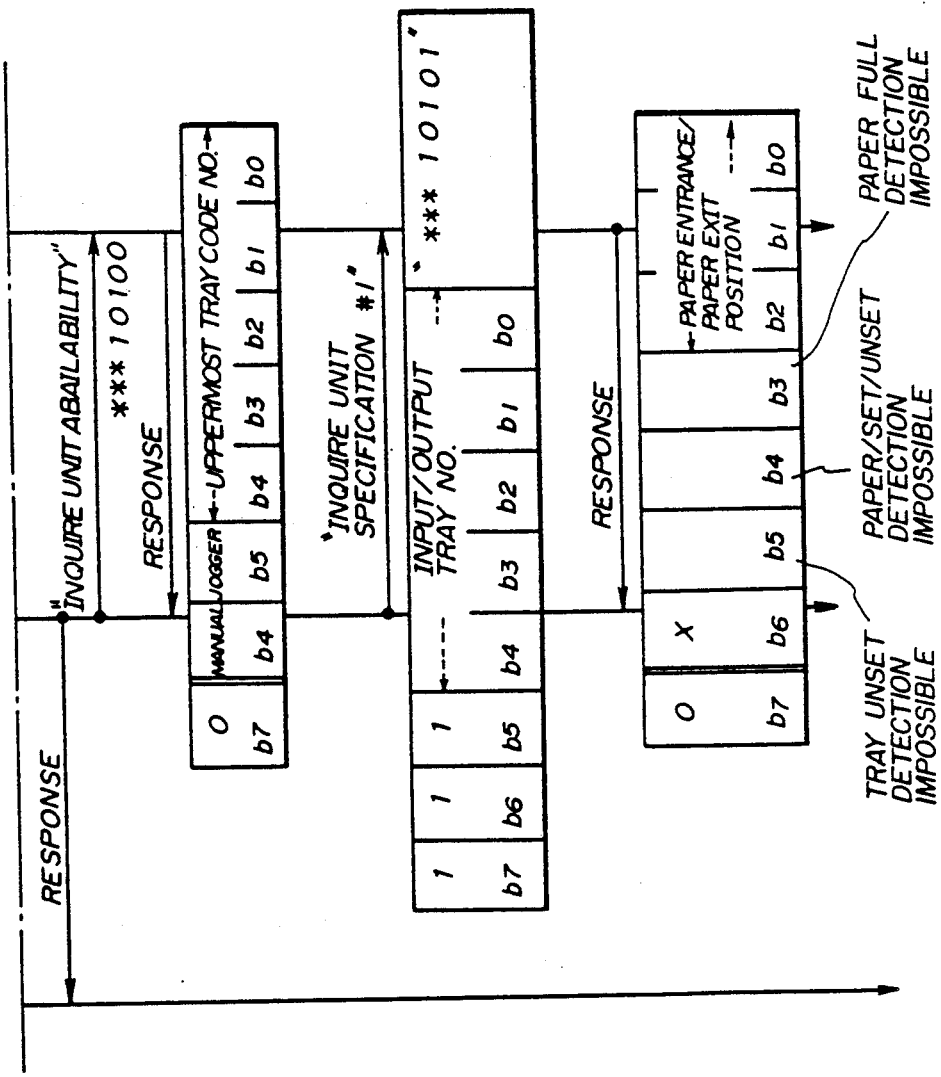

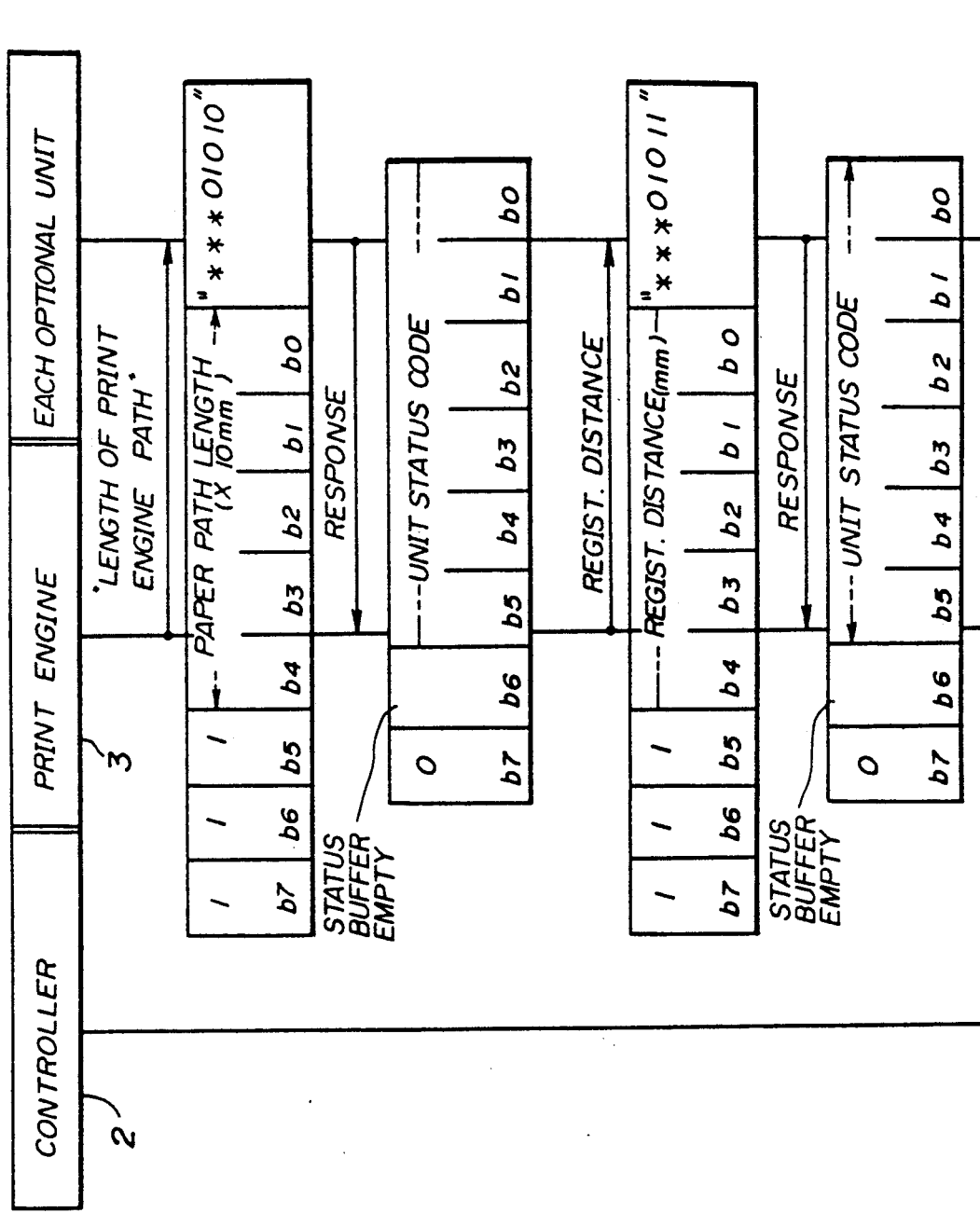

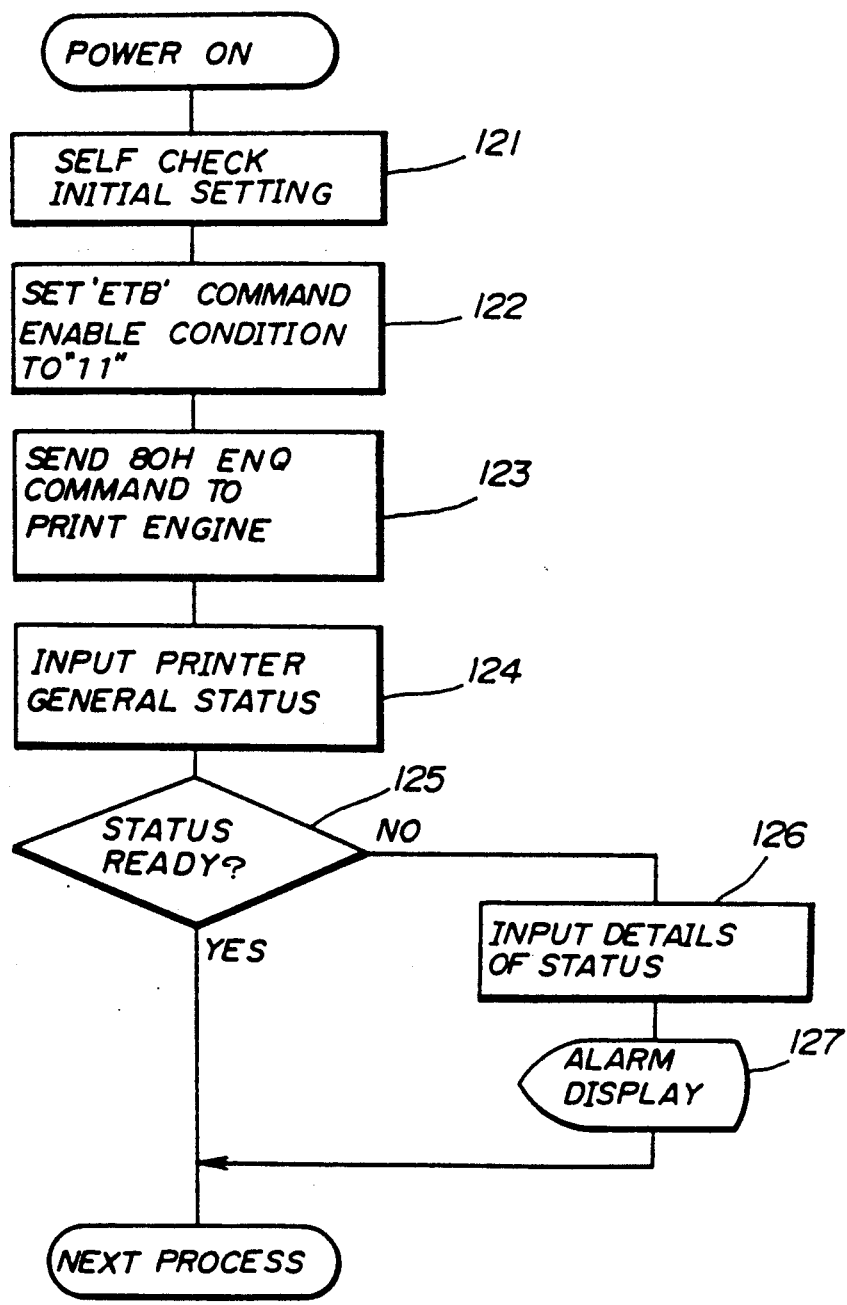

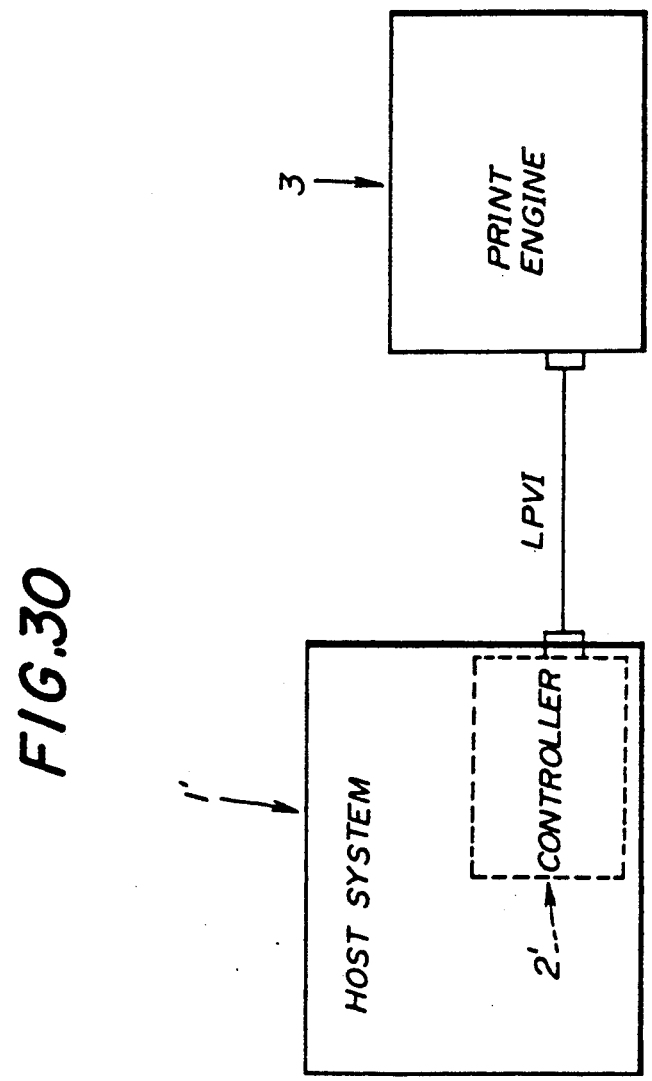

IMAGE FORMING SYSTEM

BACKGROUND OF THE INVENTION

The present invention generally relates to an image forming system and, more particularly, to an image forming system related to a printer system such as a laser beam printer, a light-emitting device (LED) printer, a liquid crystal shutter printer or an ink jet printer, or related to a high performance copying machine or a high performance facsimile machine.

Recently, an image forming apparatus has been formed as "a system". Generally, an image forming system such as a laser beam printer system is made up of a mainframe of the system (system mainframe), and various optional units which are detachably attached to the system mainframe. A system mainframe receives character code information or image information supplied from a host system coupled to the image forming system, and forms an image on a recording medium. A word processor, an office computer or a personal computer may be used as a host system. Another type of the system mainframe is known which directly receives image information from a host system. In this case, the image forming function is provided in the host system. Optional units are coupled to the system mainframe through respective interfaces. Those examples of optional units are a recording medium feed unit such as a large-capacity paper feed unit or a multi-tray (cassette) paper feed unit, a recording medium transporting unit such as a paper transporting unit for use in duplex print, and a recording medium eject unit such as a large-capacity paper eject unit or a multi-tray (cassette) paper eject unit.

However, in conventional image forming systems, a problem occurs when a host system or an image processing device inquires status of an image forming device (print engine) or an optional unit. That is, in a case where a plurality of pieces of information exist, only one piece of information having the highest priority is sent back to the host system or the image processing device.

Additionally, in conventional image forming systems, the host system or the image processing device must issue different commands having different contents in order to obtain a variety of status or numerical information relating to the image forming device.

Further, the host system or the image processing device must always manage status of the image forming device and status of the optional units coupled thereto. For this reason, the management of the image forming device and the optional units is very complex, particularly in a case where an increased number of optional units are coupled to the image forming device.

SUMMARY OF THE INVENTION

Accordingly, a general object of the present invention is to provide an improved image forming system in which the aforementioned disadvantages are got rid of.

A more specific object of the present invention is to provide an image forming system in which the host system or the image processing device can obtain status information of the print engine or the optional devices with improved efficiency.

The above-objects of the present invention are achieved by an image forming system comprising image generating means for generating image data, image forming means, coupled to the image generating means, for forming an image based on the image data on a recording medium, optional units coupled to the image forming means, optional units including at least one recording medium feed unit feeding the recording medium to the image forming means, and at least one recording medium eject unit ejecting the recording medium supplied from the image forming means, and a serial signal line coupling the image forming means and the optional units, the serial signal line being in common with the optional units. The image forming means includes management means for managing a variety of information including data relating to its own status and data relating to status of the optional units, the variety of information being represented by corresponding codes based on total status of the image forming means and the optional units. Each of the optional units includes management means for managing the data relating to its own status, and communication means for sending the image forming means the data relating to its own status.

Additional objects, features and advantages of the present invention will become apparent from the following detailed description when read in conjunction with the accompany drawings.

BRIEF DESCRIPTION OF THE DRAWINGS

FIG. 3 is a block diagram of an outline of another system structure according to the present invention;

FIG. 10 diagram of signals related to a laser beam printer/video interface LPVI employed in the embodiment;

FIG. 12 is a diagram of an outline of the mechanical the engine mainframe and each optional unit coupled thereto;

FIG. 13A is a block diagram of a configuration of an engine controller;

FIG. 14 is a diagram illustrating commands and responses transferred between a controller and a print engine;

FIG. 15 is a diagram illustrating commands and responses transferred between the print engine and each optional unit;

FIG. 18 is a diagram illustrating how to combine FIGS. 18A and 18B;

FIGS. 18A and 18B are diagrams of a procedure for transmitting commands and responses when the controller confirms the states of the print engine and each optional unit;

FIG. 19 is a diagram illustrating how to combine FIGS. 19A and 19B;

FIG. 20 is a diagram illustrating how to combine FIGS. 20A and 20B;

FIGS. 20A and 20B are diagrams of a procedure for transmitting commands and responses when the controller confirms the states of the print engine and each optional unit;

FIG. 21 is a diagram illustrating how to combine FIGS. 21A and 21B;

FIGS. 21A and 21B are diagrams illustrating the contents of a print engine status code;

FIG. 22 is a diagram illustrating how to combine FIGS. 22A and 22B;

FIGS. 22A and 22B are diagrams illustrating the contents of an optional unit status code;

FIG. 24 is a diagram illustrating the relationship between a status group code and a status level represented by the status group code;

FIG 25 is a diagram of the relationship between bits $b_1$, $b_0$ of an argument of an 'ETB' command and the contents of general status;

FIG. 26 is a diagram illustrating how to combine FIGS. 26A and 26B;

FIGS. 26A and 26B are flowcharts of a procedure for setting various parameters and inquiries;

FIG. 27 is a block diagram illustrating how to combine FIGS. 27A and 27B;

FIGS. 27A and 27B are flowcharts of a procedure for setting various parameters and inquiries;

FIG. 28 is a flowchart of a procedure for designating a group of devices, status of which are inquired by the controller at the time of power on;

FIG. 30 is a block diagram of the structure of another laser beam printer system according to the present invention.

DESCRIPTION OF THE PREFERRED EMBODIMENTS

A description is given of a preferred embodiment of the present invention.

Figure 1:
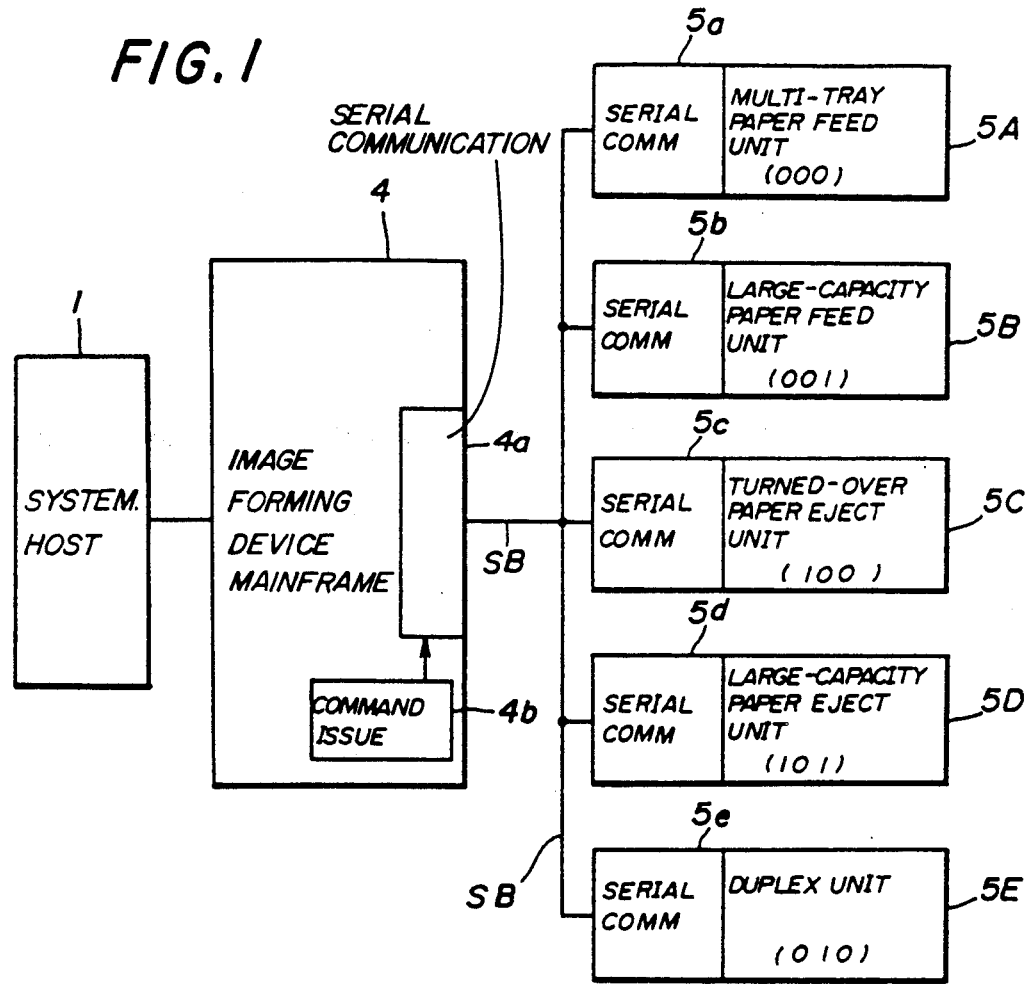
FIG. 1 is a block diagram of an outline of a system structure according to the present invention.

Referring to FIG. 1, thee is illustrated an image forming system. The illustrated image forming system includes a host system 1, an image forming system mainframe (hereinafter simply referred to as a system mainframe) 4, and five optional units 5A and 5E. The system mainframe 1 receives information on character codes or image information from the host system 1, and forms a corresponding image on a recording medium such as a photosensitive drum. The optional units 5A-5E are detachably coupled to the system mainframe 4.

The optional units 5A and 5B are recording medium feed units. Particularly, the optional unit 5A is a multi-tray (cassette) paper feed unit, and the optional unit 5B is a large-capacity paper feed unit. The optional units 5C and 5D are paper eject units. Particularly, the optional unit 5C is a turned-over paper eject unit, and the optional unit 5D is a large-capacity paper eject unit. The optional unit 5E is a paper transport unit for duplex print. A signal line SB is provided in common with the optional units 5A-5E, and electrically connects the optional units 5A-5E to the system mainframe 4. The optional units 5A-5E have serial communication circuits $5a$-$5e$, and the system mainframe 4 has a serial communication circuit $4a$.

The system mainframe 4 further has a command issue circuit $4b$, which issues commands which include identification codes for separately specifying the corresponding optional units 5A-5E and a command of a different type (global command) which includes a common identification code for specifying all the optional units 5A-5E at one time. The commands issued by the command issue circuit $4b$ are supplied to the optional units 5A-5E through the serial signal line SB.

With the above-mentioned structure, the system mainframe 4 can separately specify each of the optional units 5A-5E. Alternatively, the system mainframe 4 can specify all the optional units 5A-5E at one time when a serious error occurs in the system and all mechanical parts of the system are required to be stopped urgently, for example. In such a case, a command (global command) instructing urgent stop is supplied to the optional units 5A-5E at the same time.

A communication protocol between the system mainframe 4 and the optional units 5A-5E is described below. A signal from the system mainframe 4 to the optional units 5A-5E is transferred as a command. A signal from the optional units 5A-5E to the system mainframe 4 is transferred as a response.

Figure 2A:
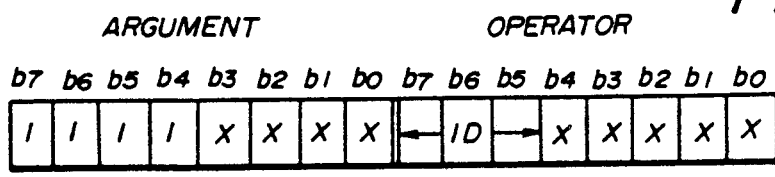
FIG. 2 is a diagram of an example of the structure of a command which is issued from an image forming device mainframe to each optional unit.

As shown in FIG. 2, one command consists of an operator composed of 8 bits and an argument composed of 8 bits. The argument is sent first, and the operator is sent second. Three high-order bits of the argument $b_7$-$b_5$ are always set to "111". Normally, as shown in FIG. 2(A), an identification (ID) code for specifying one of the optional units 5A-5E (communication destination) is formed by three high-order bits $b_7$-$b_5$ of the operator and the type of command is formed by bits $b_4$-$b_0$.

The identification code (ID code) for each of the optional units 5A-5E shown in FIG. 1 is defined as follows Paper feed unit 5A: 000(IN#1)
Paper feed unit 5B: 001(IN#2)
Duplex unit 5E 010(DPX#1)
Paper eject unit 5C: 100(OUT#1)
Paper eject unit 5D: 101(OUT#2)

Two high-order bits of each of the above-mentioned identification codes represent the type of optional unit (type: paper feed, duplex paper transport or paper eject), and one low-order bit thereof represents a number of optional unit (#1 or #2).

Figure 2B:
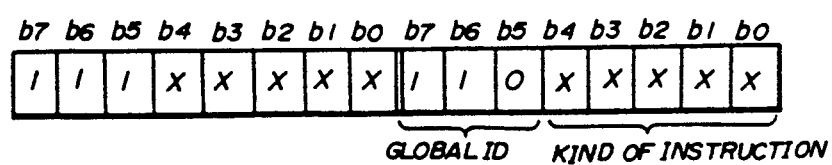

FIG. 2(B) illustrates the aforementioned global command which contains a specific command for specifying all the optional units 5A–5E (hereinafter referred to as a global ID address). Hereinafter, this command is referred to as a global ID command. The global ID command has the global ID address which always has a value of "110" in three high-order bits $b_7-b_5$ thereof, and a code which consists of bits $b_4-b_0$ and specifies the type of command (instruction). For example, when urgent stop is requested, the global ID command having bits $b_4-b_0$ set to "01111" is issued. When each of the optional units 5A–5E receives the global ID command through the respective serial communication circuits 5a–5e, it immediately executes the global ID command without sending back any response.

The global ID command is used:

(1) when the image forming system is initialized (initialization and self-diagnosis), (2) when a paper size is set in an optional unit which does not have a paper size self-detection function, or (3) when the system mainframe 4 requires to inform each optional unit of urgent information (when paper jam occurs, for example).

LOGICAL ID AND DEVICE ID

FIG. 3 is a block diagram of the basic structure of an image forming system which is extended from the configuration shown in FIG. 1. In FIG. 3, those parts which are the same as those shown in FIG. 1 are given the same reference numerals.

The illustrated extended image forming system includes the host system 1, the system mainframe 4, and seven optional units 5A–5G which are detachably coupled to the system mainframe 4. That is, two optional units 5F, 5G are added to the system shown in FIG. 1. The optional unit 5F is a multi-tray (cassette) paper feed unit, and the optional unit 5G is a multi-tray paper eject unit. As indicated by broken lines, it is possible to further provide the system with optional units.

The system mainframe 4 can control, at the same time, a maximum of two optional paper feed units, a maximum of two optional paper eject units, and a maximum of one duplex unit. The simultaneous control by the system mainframe 4 denotes a state where the following three conditions are satisfied. First, the system mainframe 4 can communicate with optional units and can process execution commands, inquire commands, selection commands, and so on. Second, feed, transport and eject of paper can be done by commands. Third, an optional unit is selected as a transport path of paper.

The system mainframe 4 has six different identification codes for use in control (hereinafter referred to as logical ID codes). These logical ID codes correspond to the aforementioned identification codes (ID) used in of the configuration shown in FIG. 1. The following logical ID codes are prepared in the present embodiment (shown in FIG. 3), in which each of all the optional units 5A–5G is classified into a paper feed unit, a paper eject unit or a duplex unit.

Optional paper feed unit (IN#1): 000
Optional paper feed unit (IN#2): 001
Optional duplex unit (DPX.INP) : 010
Optional duplex unit (DPX.OUT) : 011
Optional paper eject unit (OUT#1): 100
Optional paper eject unit (OUT#2): 101

Each of the above logical ID codes consists of three bits. Two high-order bits among the three bits form a unit type code for identifying the type of optional unit (IN, OUT, or DPX). The remaining one low-order bit forms a code for identifying a unit number (#1 or #2).

The system mainframe 4 has a serial communication function of sending the logical ID codes to the signal line SB. Normally, an image processing part and an image forming part which are included in the system mainframe 4, as well as the host system 1 can designate the optional units 5A through 5G by using the logical ID codes.

The optional units 5A through 5G have individual identification codes (hereinafter simply referred to device ID codes), and have a communication function of sending the respective device ID codes to the signal line SB. Further, each of the optional units 5A through 5G stores a 2-bit code, which identifies its own unit type in a similar manner as the logical ID code includes the 2-bit unit type code. Each optional unit can determine which one of paper feed unit (IN), paper eject unit (OUT), and duplex unit (DPX) is its own unit type.

When a device ID code provided for each unit type consists four bits, 16 optional units can be identified for each unit type, and therefore a maximum of 48 optional units can be identified.

The following device ID codes are used in the present embodiment:
Multi-tray paper feed unit 5A: (IN)0000,
Multi-tray paper feed unit 5F: (IN)0001,
Large-capa. paper feed unit 5B: (IN)0010,
Turned-over paper eject unit 5C: (OUT)0000,
Multi-tray paper eject unit 5G: (OUT)0001,
Large-capa. paper eject unit 5D: (OUT)0010, and
Duplex unit 5E: (DPX)0001

In actuality, every optional unit independently stores the own unit type in the form of a 2-bit unit type code. Thus, the 4-bit code following the unit type code is a device ID code.

The system mainframe 4 has the following table in its internal memory.

TABLE

| Logical ID code | Device ID code |
|---|---|
| 000(IN#1) | 0000 |
| 001(IN#2) | 0010 |
| 010(DPX.INP) | 0001 |
| 011(DPX.INP) | 0001 |
| 100(OUT#1) | 0000 |
| 101(OUT#2) | 0010 |

Logical ID codes having the same unit type are assigned optional units of the same unit type, and device ID codes of optional units of the same unit type are stored in the table. For example the logical ID code IN#1 is assigned an optional unit identified by the device ID code (IN)0000, which is the same unit type as IN#1. On the other hand, each of the optional units 5A–5G has a memory which stores its own device ID code, and a memory which stores a logical ID code when it is assigned the optional unit.

It is noted that the unit type code (a code for identifying IN, OUT or DPX) is shown in the aforementioned table as if it is stored as a part of the device ID code. However, as described previously, the unit type can be specified by the logical ID code, and the device ID code is stored for the specified logical ID code. For this reason, in actuality, the unit type code is not required to be stored in the device ID code memory.

In the above-mentioned manner, by defining five logical ID codes and the same number of device ID codes, the system mainframe 4 can designate and control each optional unit by only the related logical ID code.

In the present embodiment, as shown in FIG. 3, logical ID code IN#1 is assigned the multi-tray paper feed unit 5A. In FIG. 3, the logical ID code IN#1 is shown together with 'Log'. Logical ID code IN#2 is assigned the large-capacity paper feed unit 5B, and logical code OUT#1 is assigned the turned-over paper eject unit 5C. Logical ID code OUT#2 is assigned the large-capacity paper eject unit 5D, and logical ID code DPX (INP and OUT) is assigned the duplex unit 5E. In FIG. 3, the optional units which are assigned the logical ID codes are denoted by blocks drawn by double lines. Thus, the system mainframe 4 can simultaneously control the five optional units 5A through 5E.

The assignment of logical ID codes can be changed as necessary. Thereby, the system mainframe 4 can control the other optional units 5F and 5G and further an increased number of optional units.

The system mainframe 4 can communicate, through the signal line SB, with the optional units 5A–5G in accordance with a communication protocol for use in serial communication. The communication protocol provides two levels of commands. Commands of a first level are basic commands, and commands of a second level are enhanced (extended) commands.

A basic command is used for controlling optional units which are assigned logical ID codes as follows. If the image forming system has and will have less than three optional paper feed units, less than three optional paper eject units, and less than two duplex unit, the "basic command" protocol can support all of system features. Such a system is defined as a basic system. In the basic system, the code number of the device ID code may be identical to the code number of the logical ID code.

An enhanced command is used in case where the image forming system includes three or more optional paper feed units, three or more optional paper eject units, or two or more duplex units. In such a case, the system mainframe 4 can control paper feed, paper ejection and duplex print to be executed by the third or n-th (n is an arbitrary number larger than 3) optional paper feed unit or paper eject unit, or the second or more optional duplex unit by re-assigning the device ID code to a logical ID code of the same unit type, using an enhanced command.

The system mainframe 4 has a function of issuing status inquiring commands which are directed to an image processing section provided in the system mainframe 4 from an image forming section provided therein or directed to the assigned optional units (optional units 5A–5E in the case shown in FIG. 3) through the image forming section, and a function of letting the image forming section or a specific optional unit send back a plurality of status one by one according to predetermined priority. Such functions will be described in detail later.

LASER BEAM PRINTER SYSTEM

A description is given of a laser beam printer system according to an embodiment of the present invention.

Figure 4:
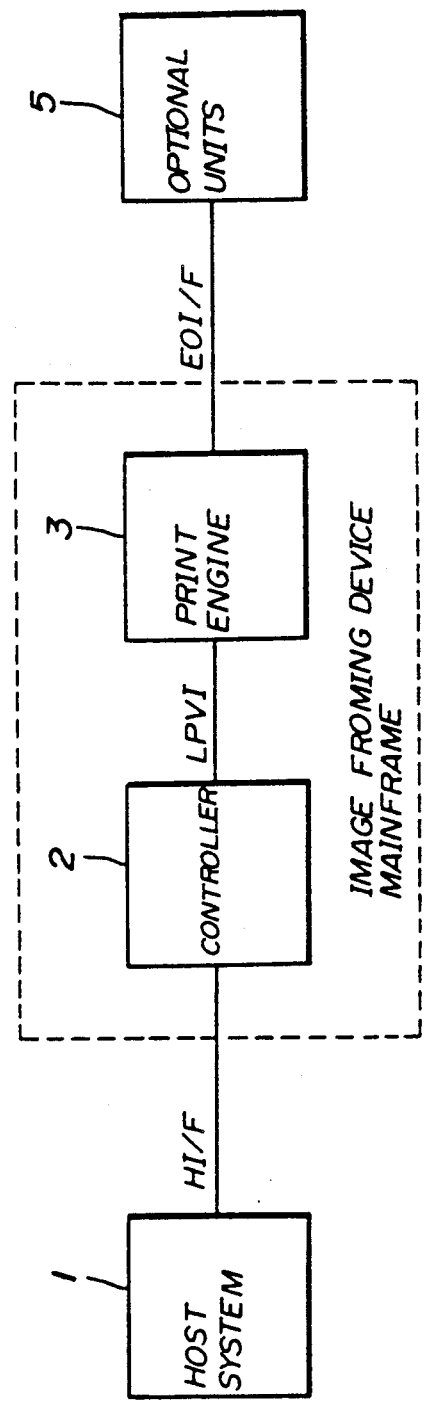
FIG. 4 is a block diagram of an outline of a laser beam printer system according to an embodiment of the present invention.

FIG. 4 is a block diagram of an outline of the laser beam printer system. In FIG. 4, those parts which are the same as those in FIGS. 1 through 3 are given the same reference numerals. The illustrated laser beam printer system includes the host system 1, the system mainframe 4 made up of a controller 2 and a print engine 3, a group of optional units such as optional units 5A–5G, a host interface HI/F, a laser beam printer/video interface LPVI, and an engine/option interface EOI/F).

The host system 1 is an information processing device for sending character information or image information, such as a word processor, an office computer or a personal computer. The controller 2 receives character information or image information from the host system 1, and forms video data for every page. The print engine 3 is an image forming device which prints image on paper on the basis of information supplied from the controller 2. The host interface HI/F couples the host system 1 and the controller 2, and can be formed by RS232C or Centronics, for example. The laser beam printer/video interface LPVI couples the controller 2 and the print engine 3, both of which form the system mainframe 4. This interface is independent of functions of the print engine 3. It is noted that a conventional laser beam printer/video interface is based on different functions of different print engines. The engine/option interface EOI/F couples the print engine 3 and the group of optional units 5 through the aforementioned common signal line (serial bus) SB, and passes a command including the aforementioned logical ID code directed to an optional unit (or all the optional units) from the print engine 3 and the response sent back from the designated optional unit (units).

Figure 5:
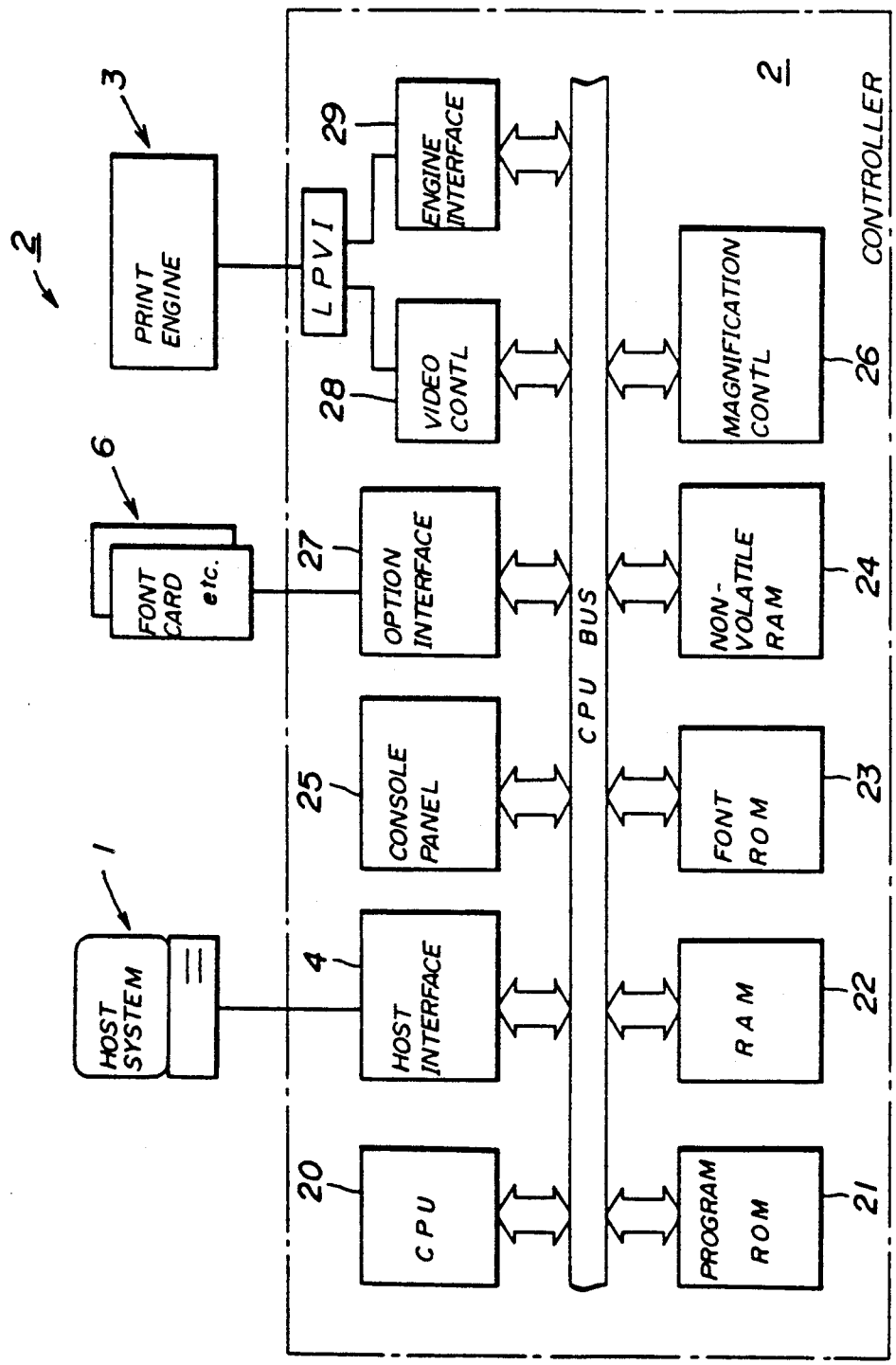
FIG. 5 is a block diagram of a controller 2 used in the system shown in FIG. 4.

FIG. 5 is a block diagram of a hardware configuration of the controller 2. Referring to FIG. 5, the controller 2 is made up of a central processing unit (CPU) 20, a read only memory (hereinafter simply referred to as a ROM) 21, a random access memory (RAM) 22, a font read only memory (font ROM) 23, a non-volatile RAM 24, a console panel (operation panel) 25, a magnification control processor 26, an option interface 27, a video controller 28, an engine interface 29, the aforementioned host interface 4 and laser beam printer/video interface LPVI. These structural elements are coupled to a CPU bus.

The CPU 20 controls the entire controller 2, and can be formed by a conventional 16-bit microcomputer or a conventional 32-bit microcomputer. The ROM 21 stores microcodes (program) for controlling the CPU 20. The RAM 22 is a large-capacity random access memory and is used for the following applications:
(a) system memory,
(b) input buffer,
(c) page buffer,
(d) font file,
(e) macro-file,
(f) image file,
(g) print control file, and
(h) video buffer.

Figure 6:
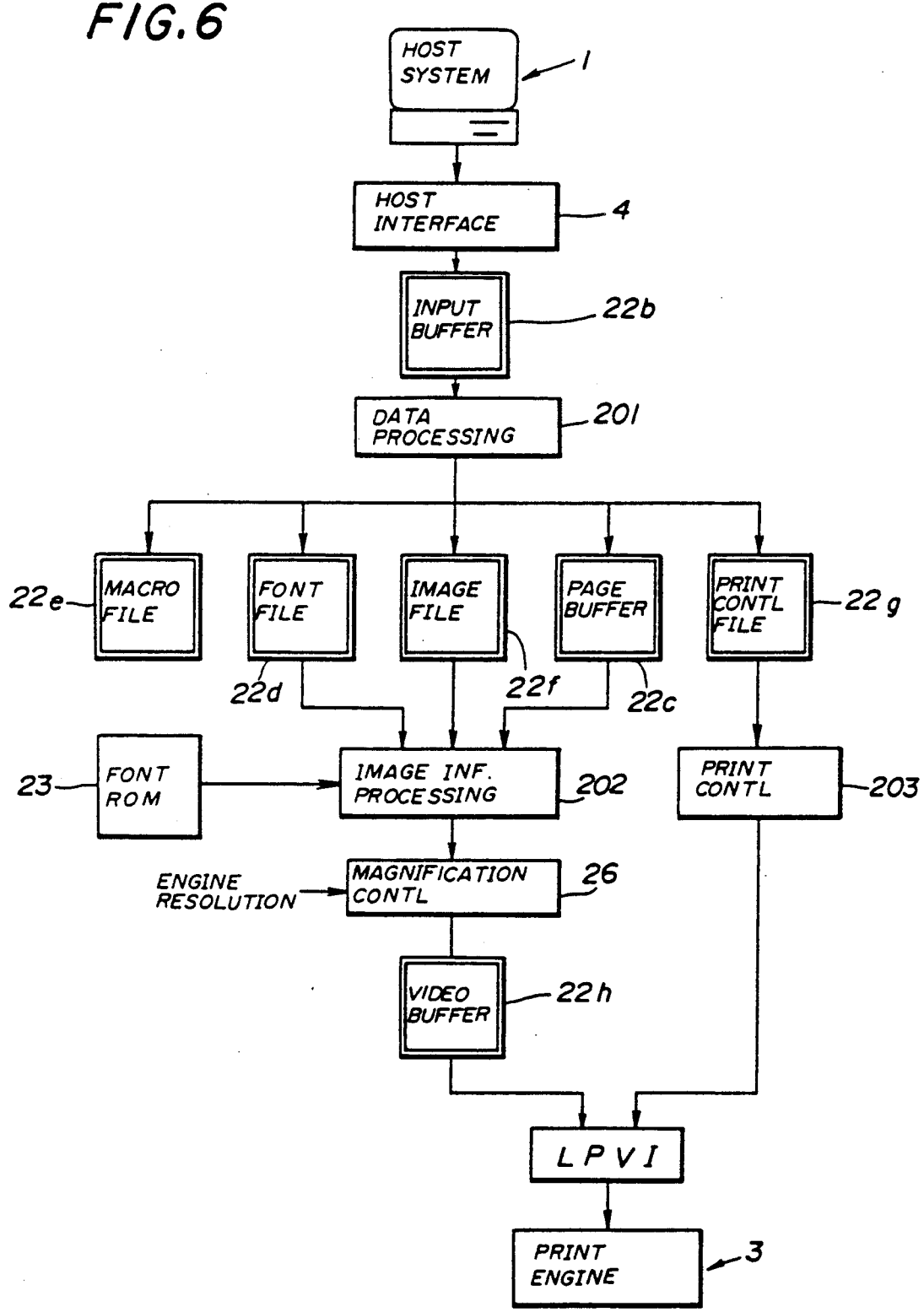
FIG. 6 is a block diagram illustrating a flow of data and the relationship between buffers and files formed in a RAM 22 shown in FIG. 5.

FIG. 6 illustrates a flow of data processing as well as the relationship between each buffer and file formed in the RAM 22. Data sent from the host system 1 passes through the host interface 4 and is stored in an input buffer 22b. The data stored in the input buffer 22b is read out therefrom under the control of a data processing part 201, and is then registered in a page buffer 22c, a font file 22d, a macro-file 22e, an image file 22f or a print control file 22g in accordance with the type of data. In detail, print sequence control data (designation of paper transport route, designation of the number of sheets of paper to be printed, and the like) is registered in the print control file 22g. Information on layout of paper (relationship between print data and print position or the like) is registered in the paper buffer 22c. Image information is registered in the image file 22f, and down-loaded font is registered in the font file 22d. Overlay information is registered in the macro-file 22e.

An image information processing part 202 arranges the contents of the image file 22f, the font file 22d and the font ROM 23 in accordance with the contents of the page buffer 22c, and stores the arranged contents in the video buffer 22h through the magnification controller 26. When print data amounting to one page in the video buffer 22h is completed, the print controller 20 activates the print engine 3 through the laser beam printer/video interface LPVI in accordance with the contents of the print control file 22g. When the print engine 3 is switched to an image recording timing, the video buffer 22h sends the print engine 3 the formed video data through the laser beam printer/video interface LPVI. The print engine 3 prints an image formed by the video data on paper.

Turning back to FIG. 5, the font ROM 23 stores font data for converting character information supplied from the host system 1 through the host interface 4 into image information. The non-volatile RAM 24 stores information for controlling operating states of the printer after power ON, and stores the following data:

| (a) print direction | (b) font |
|---|---|
| (c) character size | |
| (d) space between lines | |
| (e) paper entrance | (f) paper exit |
| (g) host interface | |

The contents of the non-volatile RAM 24 are renewed through the console panel 25.

Figure 7:
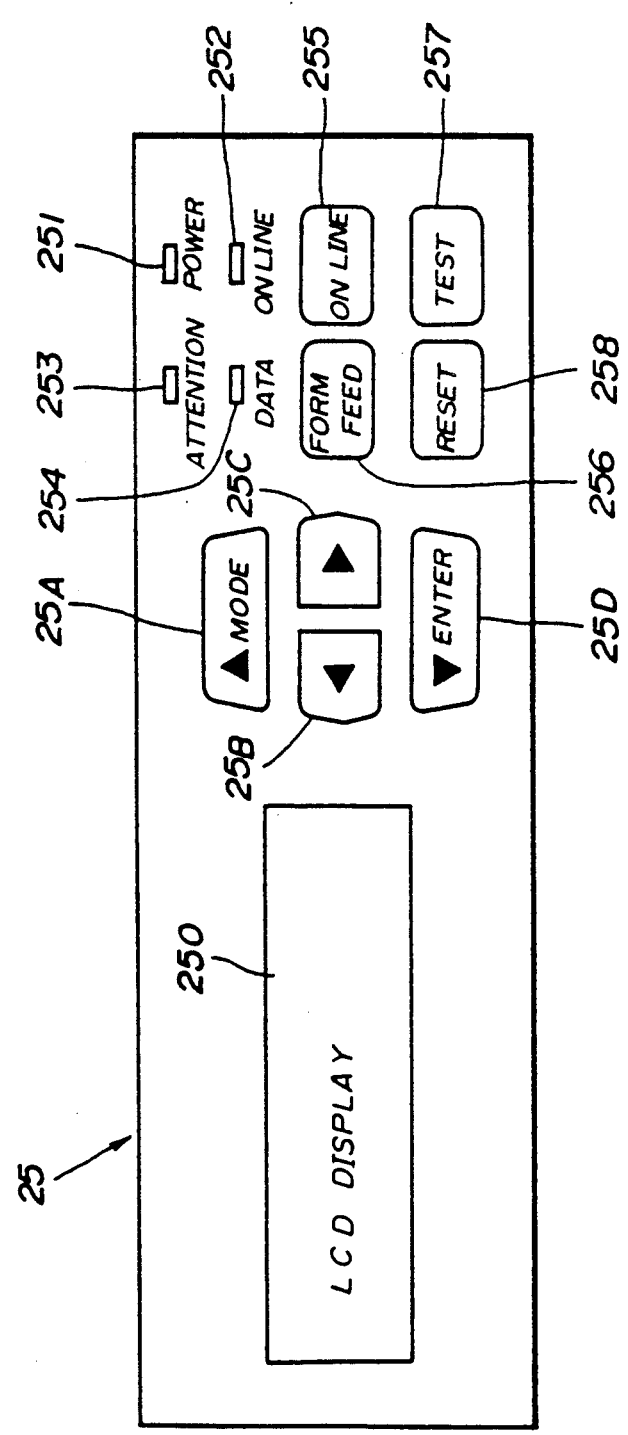
FIG. 7 is a diagram of an outline of a console panel 25 shown in FIG. 5.

FIG. 7 illustrates an outline of the console panel 25. A manipulation for revising the contents of the non-volatile RAM 24 through the console panel 25 is referred to as mode setting. The console panel 25 is configured as follows. An LCD (liquid crystal device) display device 250 displays the status of the printer system and the contents of the mode setting, by using characters. A power LED (light-emitting diode) 251 is lighted when power is turned ON. An on-line LED 252 indicates that the printer system is in the on-line state. An attention LED 253 repeatedly turns ON and OFF when a fault occurs in the printer system. A data LED 254 indicates that there is print data in the print engine 3. An on-line switch 255 is switchable between the on-line mode and the off-line mode of the printer system. A form-feed switch 256 is used for printing data in the printer when the data LED 254 is being turned ON. A test switch 257 is used to activate the self-diagnostic test function of the printer system. A reset switch 258 is used for resetting the printer system. Further, there are provided switches 25A, 25B, 25C and 25D for use in mode setting.

Figure 8:
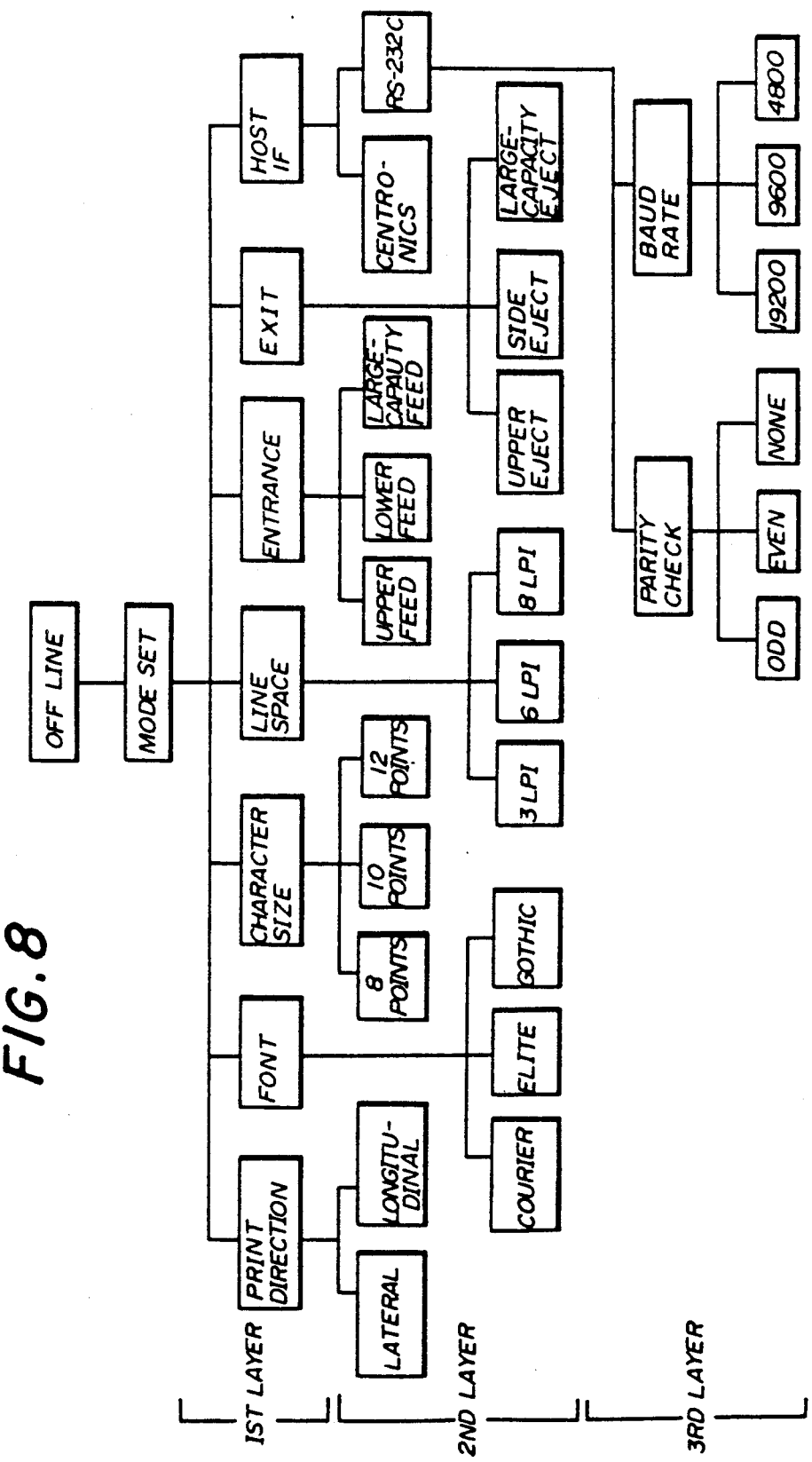
FIG. 8 is a diagram of a hierarchical structure of the contents of mode setting which is performed through the console panel 25.

FIG. 8 illustrates the mode setting. As shown in FIG. 8, the mode setting has a hierarchical structure in which items of mode setting are hierarchically arranged By depressing the mode switch 25A having an upward direction in the on-line state, the printer system is switched to the mode setting state so that a "print direction" item in the first hierarchical layer is selected. When an operator wishes to select another setting item of the first hierarchical layer, the switch 25B (a left oriented arrow is printed thereon) or the switch 25C (a right oriented arrow is printed thereon) is manipulated.

Each time the switch 25C is depressed, the setting items are serially changed in the order of "font", "character size", "line space", "paper entrance", "paper exit" and "host interface". On the other hand, each time the switch 25B is depressed the setting items are serially changed in the reverse direction from "host interface". When the item to be set relates to "font", the "font" setting item is selected by the switch 25C and then the switch 25D (especially called enter switch) is depressed so that the mode setting is shifted to the second hierarchical layer.

There are three fonts, that is, Courier, Elite and Gothic in the second hierarchical layer. One of the three fonts is selected by manually operating the switches 25B or 25C. When selecting "Elite" for example and registering the same, the enter switch 25D is depressed so that the selected font, "Elite" is registered in the non-volatile RAM 24. The registered font can be revised by operating the switch 25B or 25C and then depresses the enter switch 25D.

In the setting items in the first hierarchical layer, the following specifications are available in the second hierarchical layer:

"print direction": longitudinal and lateral directions
"character size":8 points, 10 points and 12 points
"line space": 3 LPI (line per inch), 6 LPI and 8 LPI
"paper entrance": upper paper feed cassette, lower paper feed cassette, and large-capacity paper feed unit
"paper exit": upper paper eject tray, side paper eject tray, and large-capacity paper eject unit.
"host interface": Centronics and RS-232C.

When RS-232C interface is selected as "host interface", it is possible to select the type of parity check and baud rate (transmission rate) in the third hierarchical layer.

Turning back to FIG. 5, the magnification control processor 26 controls the magnification of the video image information so as to fit a resolution of the print engine 3. The host interface 4 couples the host system 1 and the controller 2, and provides a Centronics-based parallel interface and RS-232C interface, one of which can be selected through the aforementioned console manipulation. The option interface 27 is used for extending the function of the printer system or supplying the printer system with information on font and programs from an external device. An IC card 6 is formed by an IC card which is available in the market. For example, currently available IC cards are classified into a font card, a program card or a card which stores font and program.

Figure 9:
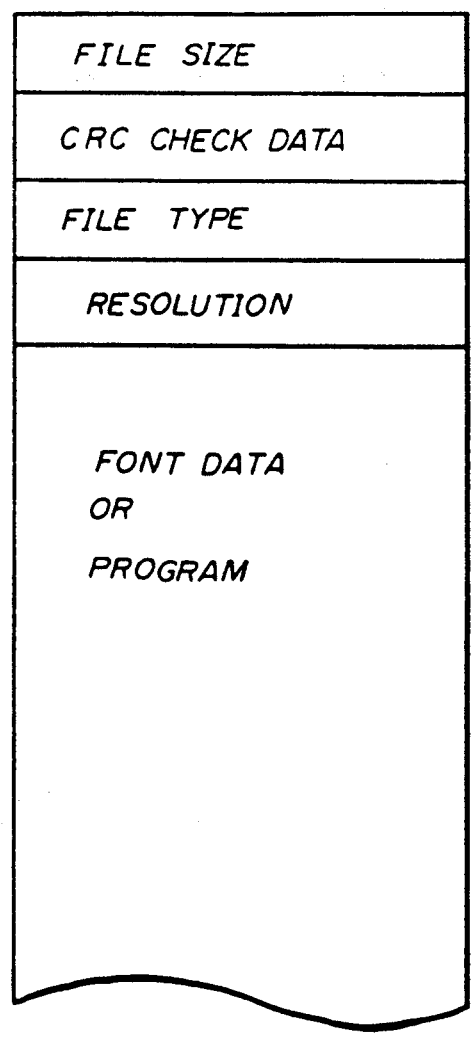
FIG. 9 is a diagram of a format of an IC card 6 shown in FIG. 5.

As shown in FIG. 9, the IC card 6 has the illustrated file formats, that is, file size, CRC check data, file type, resolution and font data or program. The type of data is identified on the basis of file type. That is, a value of "1" of the file type indicates font, and a value of "0" of the file type indicates program.

Turning back to FIG. 5 again, the video controller 28 converts video data which is stored in the video buffer 22h and which consists of bits corresponding to the width of the bus of the CPU 20 (16 bits or 32 bits), into serial data or 8-bit parallel data, and sends the converted data to the print engine 3. The engine interface 29 has a serial communication function of monitoring the state of the print engine 3 by the bidirectional serial signal via the laser beam printer/video interface LPVI and passing commands to control the print engine 3.

FIG. 10 shows signals related to the laser beam printer/video interface LPVI. As is illustrated, signals are classified into a video signal system, a control signal system and a power signal system. The video signal system includes five signals, /WCKL, /WDATA, /LSYNC, /LGATE, and /FGATE, which will be described in detail later. The control signal system includes four signals, /PETXD, /PERXD, PECTS and /PEDTR, which will be described in detail later. The power signal system includes two signals, that is, +5V and ground (GND). A symbol "/" means a low active signal.

The signal /WCLK is a video data synchronizing clock supplied from the print engine 3. In synchronism with the fall of this signal, image data /WDATA is sent from the video controller 28 shown in FIG. 5. A low level of the signal /WCLK corresponds to black. The signal /WDATA is video data sent from the video controller 28 shown in FIG. 5. The signal /LSYNC is a line synchronizing signal which indicates the print start position for each scan line. The signal /LGATE is a signal which indicates an effective image area in each scan line. The signal /FGATE is a signal which indicates an effective image area in the paper transport direction. This signal is in synchronism with the fall of the signal /LSYC. The signal /PETXD is a status signal by which the print engine 3 lets the controller 2 know the state of the print engine 3. The signal /PERXD is a reception data signal in serial communication for sending the controller 2 to the print engine 3. The signal /PECTS is a ready signal for the signal /PETXD. When the level of the signal /PECTS is low, the print engine 3 is allowed to send the controller 2 status information. The signal /PEDTR is a ready signal for the signal PERXD. When the level of the signal /PEDTR is low, the controller 2 is allowed to send the print engine 3 a command. "+5" is a positive power voltage, and "GND" denotes system ground.

Figure 11:
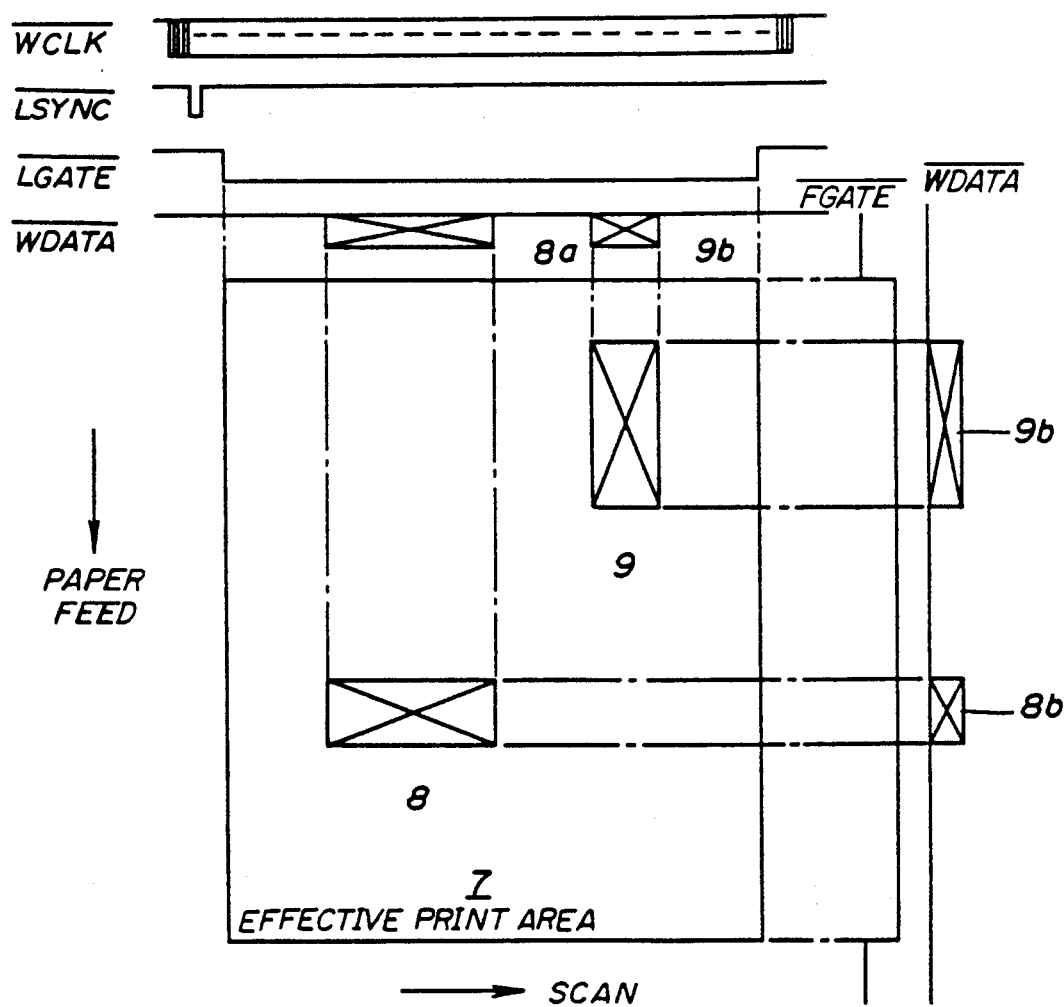
FIG. 11 is a diagram illustrating the relationship between a print area and a video signal.

FIG. 11 illustrates the relationship between the print area and the video signal. A reference numeral 7 indicates the effective print area, and a reference numeral 8 denotes an image area in which images formed by the signals /WDATA 8a and 8b are printed. A reference numeral 9 indicates an image area in which images formed by the signals /WDATA 9a and 9b are printed A description is given of the structure of the print engine 3 with reference to FIGS. 12 and 13. FIG. 12 is a diagram of an outline of an engine mainframe which is a mechanical part of the print engine 3, and optional units which are coupled to the engine mainframe. An engine mainframe 10 includes a photosensitive drum 101, a corona (electrify) charger 102, optical (laser beam) write unit 103 a developer 104, an image transfer charger 105, a cleaning unit 106, a fixing unit 107 and a driving mechanism including a plurality of paper transfer rollers including a pair of registration rollers 108 as well as motors driving these rollers.

Paper feed cassettes (trays) 11 and 12 are directly coupled to the engine mainframe 10 through cassette accommodating entrances Normally, each of the paper feed trays 11 and 12 has a capacity equal to 100-200 sheets of paper. Alternatively, multi-tray paper feed units corresponding to the aforementioned multi-tray paper feed units 5A and 5B may be inserted into the cassette accommodating entrances. A paper path switching unit 13 switches paper eject paths, and corresponds to the aforementioned turned-over paper eject unit 5C. The paper path switching unit 13 selects an upper paper eject tray 14, a duplex unit 16 or a large-capacity paper eject unit 18. It is possible to supply turned-over paper to each of the paper eject units except for the upper paper eject unit 14. Of course, it is possible to supply each of the paper eject units with paper which is not turned over. It is thus possible to arbitrarily select either a face-up function or a face-down function.

A mail box 15, which corresponds to the aforementioned multi-tray paper eject unit 5G, includes a large number of paper eject trays 15a. One of the paper eject trays 15a can be selected according to a corresponding command issued by the controller 2. The duplex unit 16, which corresponds to the aforementioned duplex unit 5E, refeeds paper to the engine mainframe 10 for duplex print. Paper having a surface on which an image has been printed through the engine mainframe 10 is turned over through the duplex unit 16, and then supplied to the engine mainframe 10 again. The illustrated duplex unit 16 has a first paper path which passes the paper through a paper path 161 without stopping the same and directly transports the paper from the paper path 161 to the paper feed side The duplex unit 16 further has a second paper path which stacks the fed paper in a stacker 162 by a requested number of sheets and then transports the stacked sheets one by one in turn.

A large-capacity paper feed unit 17 corresponds to the aforementioned large-capacity paper feed unit 5B and has a capacity equal to 2,000 sheets of paper. A large-capacity paper eject unit 18 corresponds to the aforementioned large-capacity paper eject unit 5D and has a capacity equal to 2,000 sheets of paper. When the number of sheets which the large-capacity paper eject unit 18 can accommodate is designed to be larger than that for the large-capacity paper feed unit 17, it becomes possible to accommodate all the sheets of paper supplied from the large-capacity paper feed unit 17 in the large-capacity paper eject unit 18. The engine mainframe 10 and the optional units are mounted on a printer table 19. The aforementioned engine/option interface EOI/F electrically couples the engine mainframe 10 and the optional units (the paper path changing unit 13, the mail box 15, the duplex unit 16, the large-capacity paper feed unit 17 and the large-capacity paper eject unit 18). It is possible to provide another optional unit or replace one or more aforementioned optional units by other optional units so that the printer system is extended.

A description is given of a print operation executed by the engine mainframe 10. A sheet of paper is fed from selected one of the upper paper feed unit 11, the lower paper feed unit 12, the large-capacity paper feed unit 17 and the duplex unit 16 (only when paper is refed). The fed paper is maintained in a state where it is placed between a pair of the registration rollers 108. On the other hand, the photosensitive drum 101 rotates in the direction of the illustrated arrow to form a sub-scanning direction. During rotation, the surface of the photosensitive drum 102 is electrified (charged). The laser beam write unit 103 modulates light in accordance with the video signal, and projects the modulated laser beam onto the surface of the photosensitive drum 101. During writing, the modulated laser beam is moved in the main scanning direction. A surface portion of the photosensitive drum 101 onto Which the modulated laser beam is projected, is exposed so that an electrostatic latent image is formed thereon. The electrostatic latent image is developed by toner particles supplied from the developer 104. The image transfer charger 105 transfers the toner image on paper which is supplied by the registration rollers 108 at a predetermined timing, and then detaches the paper from the surface of the photosensitive drum 101. The paper having the transferred image is supplied to the fixing unit 107, in which the image is fixed on the paper due to the function of a fixing roller and a pressure applying roller, both of which are being heated. After the image is fixed on the paper, the paper is transported to the paper path changing unit 13. Then the paper is ejected through one of the paper exits A, B and C, which relate to the upper paper eject tray 14, the mail box 15 and the duplex unit 16, respectively. When the paper is transported to the duplex unit 16, it is fed to the engine mainframe 10 through one of the first and second paper paths, or to the large-capacity paper eject unit 18.

FIG. 13A illustrates a block configuration of the engine mainframe 10 and an engine controller (engine driver) 30, which controls the optional units coupled to the engine mainframe 10. A central processing unit (CPU) 31 systematically controls the engine controller 30, and can be formed by a conventional 8-bit microcomputer. A ROM 32 stores microcodes which control the operational sequence of the engine mainframe 10 and the connection of the controller 2 and the optional units. A RAM 33 stores control data and information on status of the print engine 3. An interval timer 34 forms a reference time for use in sequence control. An engine/option interface 35, which corresponds to the aforementioned engine/option interface EOI/F, is a serial communication interface for mutually connecting the paper path changing unit 13, the mail box 15, the duplex unit 16, the large-capacity paper feed unit 17 and the large-capacity paper eject unit 18 through the common line Each of the optional units is assigned the corresponding device ID code. In communication between the engine controller 30 and the optional units 13, and 15-18, a unit is specified by sending a command having the logical ID code to which the device ID code has been assigned, and a response to the command is sent back therefrom A controller interface 36 receives a command from the controller 2 through the interface LPVI and informs the controller 2 of the status of the print engine 3. An optical controller 37 receives the video signal supplied from the controller 2 via the interface LPVI, and controls the laser beam write unit 103 on the basis of the received video signal. An analog-to-digital converter (A/D converter) 38 receives an analog signal supplied from a thermistor (temperature sensor) provided in a video image forming and paper transport part 100 of the engine mainframe 10 through an operational amplifier 41, and converts the amplified analog signal into a corresponding digital signal. The thermistor monitors temperature of each of the optional units. Normally, a plurality of thermistors are provided for each of the optional units. An input/output port (I/O port) 39 passes various signals. For example, the I/O port 39 passes signals which drive motors, plungers and clutches provided in the print engine mechanical part 100. A control signal for controlling a high-voltage power source provided in the part 100 passes through the I/O port 39 and an amplifier 43. Signals derived from various sensors provided in the part 100 passes through amplifier 44 and are supplied to the I/O port 39. Signals from various switches pass through the amplifier 44 and I/O port 39.

The aforementioned structural elements are coupled to the CPU 31 through a CPU bus 40.

Figure 13B:
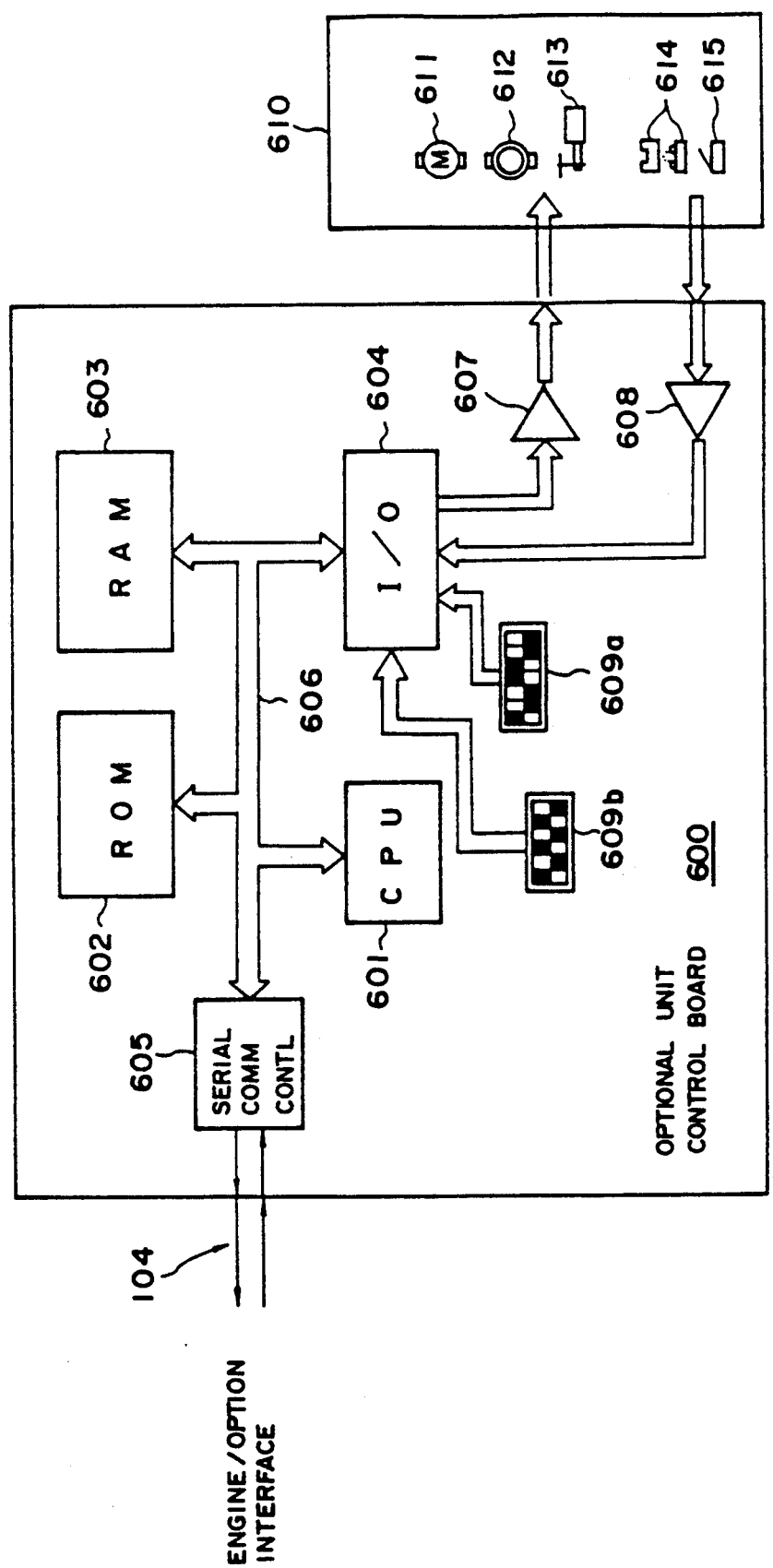
FIG. 13B is a block diagram of a configuration of an optional unit.

FIG. 13B is a block diagram of an electrical system of each of the optional units 5A-5G. The electrical system of each of the optional units 5A-5G includes a CPU 601, a ROM 602, a RAM 603, an I/O port 604, and a serial communication controller 605, all of which are mutually connected through a bus 606. The ROM 602, RAM 603, I/O port 604 and serial communication controller 605 are controlled by the CPU 601. Further, the electrical system includes a driver 607, an amplifier 608, and DIP switches 609a and 609b, all of which are connected to the I/O port 604.

The CPU 601 controls the entire electrical system. Particularly, the CPU 610 manages status of the optional unit and a change therein. The ROM 602 serves as a program memory or a data memory. That is, the ROM 602 stores programs to be executed by the CPU 601 and related permanent data, and stores unit type of the optional unit and attribute data thereof. For the optional input unit, the attribute data thereof relates to the number of paper feed cassettes (trays), information on whether the paper size self detection function is incorporated, and information on whether a manual paper feeding function is provided, for example. For the optional output unit, the attribute data thereof relates to information on whether a job separation function is provided, and information whether paper is to be ejected in the face down or face up.

The RAM 603 functions as a data register memory and a data buffer memory. Further, the RAM 603 serves as a temporary data storage memory or a working memory. Moreover, when the optional unit is assigned, the RAM 603 stores a flag indicative of the above assignment. Further, the RAM 603 serves as a register which stores the 3-bit logical ID code included in a command, which is supplied from the print engine 3 at that time. The device ID code of the optional unit is a 4-bit code and is input by the DIP switch 609a. The optional unit may be designated to input 2-bit unit type code used for specifying its own unit type by the DIP switch 609a. The DIP switch 609b is used to input the connector position of the system where the optional unit is coupled through the cable.

The serial communication controller 605 communicates with the print engine 3. As described previously, commands and responses are transferred in the serial communication procedure. In response to an instruction (command) supplied from the CPU 601, the I/O port 604 makes access to the RAM 603, and reads the device ID code or the unit type code which has been sent by the DIP switches 609a and 609b. Further, the I/O port 604 outputs signals for driving actuators of the optional-unit mechanical part 610, such as a motor 611, a clutch 612, and a plunger 613, and receives detection signals from a sensor 614, a switch 615 and so on through the amplifier 608.

COMMUNICATION BETWEEN CONTROLLER 2 AND PRINT ENGINE 3

A description is given of communication between the controller 2 and the print engine 3. The communication condition between the controller 2 and the print engine 3 is defined as follows.
Interface: asynchronous serial interface
Bit rate: 9600 baud
Parity bit: none
Stop bit: "1"

The following communication interface signals are transferred between the controller 2 and the print engine 3.

(1) /PERXD ("/" denotes a low-active logic signal.)

This signal is a reception data signal in serial communication for sending the controller 2 to the print engine 3.

(2) /PETXD

This signal is a transmission data signal in serial communication for sending a response and an event report from the print engine 3 to the controller 21.

(3) /PEDTR

This signal is a ready signal in serial communication for transmitting a command. When this signal is low, the controller 2 is allowed to send a command to the print engine 3. The print engine 3 must always hold this signal low except the time of power up or initialization (including the system configuration).

(4) /PECTS

This signal is a ready signal in serial communication for sending a response or an event report. When this signal is low, the print engine 3 is allowed to send a response or an event report to the controller 2. The controller 2 always maintains this signal low except the time when the power supply is started or the controller 2 cannot communicate with the print engine 3. If the print engine 3 receives a large number of event reports during the time when the "/PECTS" signal is high, the print engine 3 may destroy old event reports.

A description is given of a communication protocol between the controller 2 and the print engine 3. Communication is carried out by sending a command from the controller 2 to the print engine 3 and then returning a response from the print engine 3 to the controller 2.

FIGS. 14(a) and 14(b) are diagrams of an argument and an operator of the command transferred between the controller 2 and the print engine 3. The most significant bit of the argument is always "1", and the most significant bit of the operator is always "0". The command is transferred by sending its argument first and its operator second. The argument may be omitted. Even when the print engine 3 receives a command having no argument, it correctly recognizes this command When a command originally consisting of argument and operator (when the "status request" command is issued without argument) is issued without an argument, the argument of the previous same command is effective. When the print engine 3 finds no effective command, it uses the default value as the argument.

Information required by the controller 2 is transferred by sending a response from the print engine 3 to the controller 2 The length of a response is equal to one byte, and the most significant bit thereof is normally "0", as shown in FIG. 14(c). All bits of a response to "illegal" command are "1", as shown in FIG. 14(d).

An event report is used for sending information which is not requested as a response when an event occurs in an optional unit or the print engine 3 (the occurrence of paper jam or short supply). Each even report is of a one-byte length and the most significant bit thereof is "1". A 'ETB' command generated by the controller 2 controls the occurrence of event reports.

The controller 2 sends the following commands to the print engine 3. The commands transferred between the controller 2 and the print engine 3 are classified into thirteen basic commands and three enhanced commands.

Basic Commands

1. Status request 'ENQ'

This command inquires the status of the print engine 3. If the controller 2 inquires the same status again, it can send the operator only. In this case, the previous argument is effective.

2. Inquire input tray condition 'SI'

This command inquires the status of the input tray designated by an argument. If the controller 2 inquires the status of the same input tray again, only the operator is necessary. In this case, the previous input tray is effective.

3. Inquire output tray condition 'SO'

This command inquires the status of the output tray designated by an argument. If the controller 2 inquires the status of the same tray again, only the operator is necessary. In this case, the previous output tray is effective.

4. Inquire paper size of input tray 'EM'

This command inquires the paper size of the input tray designated by an argument. If the controller 2 inquires the status of the same tray again, only the operator is necessary. In this case, the previous input tray is effective.

5. Field start 'FF' (*)

This command requests the print engine 3 to feed a sheet of paper from the current active input tray or duplex unit to the registration position of the print engine 3. The sheet of paper remains at the registration position until a "print start" command is issued to the print engine 3. The print engine 3 returns the paper ID code number.

6. Print start 'VT' (*)

This command has two modes of operation. In the first mode, the "print start" command is preceded by a "feed start" command, whereas in the second mode the "print start" command instructs the print engine 3 to print a sheet of paper which is waiting at (or is in transit to) the registration position due to the preceding 'FF' command (the 'VT' command can be sent to the print engine 3 at any time or sequence after an 'FF' command is issued). In the second mode, the 'VT' command instructs the print engine 3 to execute the effect of a "feed start" command immediately followed by a first mode "print start" command. A second mode 'VT' command is not preceded by a 'FF' command. The print engine 3 judges automatically whether 'VT' command is used in the first mode or in the second mode by the sequence of commands received.

7. Input tray selection 'DC1' (*)

This command selects a desired paper input tray. The "input tray selection" command is effective from the following 'FF' commands or from the following second mode 'VT' commands.

8. Output tray selection 'DC2' (*)

This command selects a desired paper output tray. The "output tray selection" command is effective from the following command or from the following second mode 'VT' command.

9. Event report enable 'ETB'

This command enables or disables the print engine 3 to transmit an event report.

10. Print engine mode setting 'DC4' (*)

This command sets the print engine mode.

11. Paper size setting 'DC3' (*)

This command sets the paper size of the last designated input tray by using 'DC1' "input tray selection"

command. Therefore, this command is issued after sending 'DC1' command. "Paper size setting" command is effective only for the input tray which cannot detect the size of paper automatically.

12. Inquire existed paper ID 'ACK'

This command inquires an eject paper ID number. The print engine 3 sends ejected paper ID and ID buffer status as a response to the 'ACK' command. The print engine 3 stacks ejected ID numbers into the internal ID buffer and eliminates reported ID numbers from the ID buffer. However, the print engine 3 retains the last stacked ID number. "Reported ID number" is the paper ID which the print engine 3 sent to the controller 2 as an event report or as a response to the 'ACK' command. The print engine 3 always sends the earliest ID number in the internal ID buffer.

13. Reset 'CAN'

This will be described later.

Enhanced Commands

14. Assign device ID 'FS'
15. Inquire assigned device ID 'GS'
16. Inquire communication active device ID 'RS'

Those enhanced commands will be described later.

The commands given "*" are stored in a command queue buffer formed in the RAM 22 (FIG. 5) and are sequentially executed. However, if "input tray select", "output tray select", "print engine mode setting" and "paper size setting" commands (commands with an argument) are not followed by the "feed start" command nor by the "print start" command, the same kind of command but with a different argument will take precedent over the previous command. Thus, the previous command will be eliminated from the command queue buffer and will not be effective. Therefore, a tray, a paper size or a mode designated by a command is not actually selected until the 'FF' or 'VT' command is issued. Also, commands issued after 'FF' or 'VT' command do not effect commands sent prior to the 'FF' or 'VT' command.

The print engine 3 retains the status or mode which was designated by the command of "input tray select", "output tray select", "print engine mode select" or "paper size setting" until the status or mode is selected by these commands again. The print engine 3 does not spontaneously clear the command queue buffer, and clears it in response to the command from the controller 2. The "feed start" command and the "print start" command are deleted from the command queue buffer when these are executed. If the mode setting and tray select are appropriate and a sufficient number of "paper start" and "print start" commands are stored in the command queue buffer or these commands are issued by the controller 2 at appropriate intervals, the print engine 3 executes these commands with a maximum throughput (print speed).

The following is the general command sequence for the controller 2 when requesting the print engine 3 to print.

(1) Input tray selection

This command selects one of the available input trays including the duplex unit or units. If the argument is omitted, the previous input tray is effective. In case where the "input tray select" command is not issued, the previous input tray is effective.

(2) Output tray selection

This selects one of the available output trays including the duplex unit or units. If the argument is omitted, the previous output tray is effective. In case where the "output tray select" command is not issued, the previous output tray is effective.

(3) Feed request

This is done by sending the "feed start" command to the print engine 3. If this command is not issued, the next "print start" command is effective for paper feeding and printing.

(4) Print request

This is done by sending the "print start" command to the print engine 3. The controller 2 can also request the print engine 3 to execute printing with a "print request sequence of /PRINT and /PREADY handshaking", when the "Ignore /PRINT signal flag" for the "system current mode" is false "0". This request sequence is to be executed prior to 'FF' and 'VT' commands. However, it is not to be stacked into the command queue buffer and is available only with real time execution. If the controller 2 will not request printing through /PRINT signal, the controller 2 sets the print engine mode to "ignore /PRINT signal" mode by issuing the appropriate 'DC4' command. If the print engine 3 receives a request for printing both through /PRINT signal and 'FF' and 'VT' commands, execution of commands will be incorrect due to the command timing and sequence. The controller 2 requests the current status of the print engine 3 (for example, "current active input tray") just before requesting the print engine 3 to execute printing through the /PRINT signal line.

The response to the commands that are marked with "*" are stored in the command queue buffer, are transmitted by the print engine 3 just after receiving the command, not when executing the command. Therefore, the contents of a response may sometimes differ from the actual status of the executing command. For example, after replying to the input selection command, if another cassette size is mounted in the selected input tray (due to paper end, etc.), the actual paper size differs from the size sent by the print engine 3 as a response to the input selection command. In this situation, the print engine status reflects an error condition ("input size mismatch").

Status request commands relate to the "current active input tray", "current active output tray" and "system current mode status". The print engine 3 returns the status of the current active trays (those designated for the 'FF' or 2nd mode 'VT' command just starting to be executed) or the current active mode. The print engine 3 does not return tray codes or modes designated by commands yet to be executed in the command queue buffer.

The capacity of the command queue buffer is desired to be as large as possible, and depends on the maximum print speed of the print engine 3. A capacity corresponding to 32 sheets of paper may be enough where the print speed of the print engine 3 is less than 20 pages/minute.

When the print engine 3 is busy and cannot execute the 'FF' or 'VT' command due to paper end or paper full condition, the controller 2 issues "clear command queue buffer" command ('CAN') first, and then reselect a new input tray or output tray in order to change the current active input tray of the current active output tray.

In some cases, the print engine 3 predicts the status of each optional unit and responds according to these predicted status. For example, overflow or paper end condition of the optional duplex unit is predicted because these conditions depend on the outcome of previous commands. This applies also to commands still in the command buffer and yet to be executed.

COMMUNICATION BETWEEN THE PRINT ENGINE 3 AND EACH OPTIONAL UNIT

A description is given of a communication protocol between the print engine 3 and each optional unit. The following is communication condition defined between the print engine 3 and the optional units INP, DPX and OUT:
Interface: asynchronous serial interface,
Bit rate: 9600 baud,
Parity bits: none, and
Stop bit: 1.
The communication protocol is defined as follows. Transmission from the print engine 3 to each optional unit is executed by sending a command. On the other hand, transmission from each optional unit to the print engine 3 is executed by sending a response. The formats of the commands and responses used in the present system are shown in FIG. 15. A command consists of an argument and an operator. The operator indicates the end of one command. The argument consists of eight bits b7 to b0. The bits b7 to b5 of the argument are always set to "111". Similarly, the operator consists of eight bits b7 to b0. The bits b7 to b5 of the operator indicates the logical ID code of an optional unit with which the print engine 3 wants to communicate.

The present printer system uses the following commands.

Basic Commands

1. Inquire unit status "***100001"
This command inquires the status of each optional unit. The print engine 3 may send operator only (may omit an argument). In this case, the previous argument is effective.

2. Inquire paper size "***10010"
This command inquires the paper size in each optional unit. The print engine 3 can omit the argument if asking the same tray again. In this case, the previous tray code is effective.

3. Inquire unit condition "***10011"
This command inquires the condition of each optional unit. The print engine 3 can omit an argument if asking the condition of the same tray, and in this case the previous tray code is effective.

4. Inquire unit availability "***10100"
This command inquires the availability of each optional unit (manual feed function, jogger function and number of trays).

5. Inquire unit specification #1 "***10101"
This command inquires the specification of each optional unit. Each optional unit informs the print engine 3 to which paper entrance position the designated input tray is connected or to which paper exit position the designated output tray is connected. Each optional unit also notifies the print engine 3 whether it has features of detecting tray status and paper status o the designated tray or not. The argument can be omitted if the print engine 3 inquires the same tray. In this case the previous tray code is effective.

6. Inquire unit specification #2 "***10110"
This command inquires set/unset of the paper size detecting function for each input tray, and the face up feature of each output tray (or back side orientation of duplex unit). The command also inquires the feed in and eject out time for each tray. Feed in time or eject out time information is used by the print engine 3 to determine whether a paper jam occurred in the optional unit or not. The argument can be omitted if the print engine 3 inquires the same tray again. In this case, the previous tray code is effective.

7. Inquire unit specification #3 "***10111"
This command inquires the tray capacity of each optional unit. The argument can be omitted if the print engine 3 inquires the same tray again. In this case, the previous tray code is effective.

8. Inquire eject paper ID "***11000"
This command inquires of each optional output unit ejected (ejection completed) paper ID.

9. Inquire unit firmware version "***1111"
This command inquires an available firmware version provided in each optional unit.

10. Tray selection "***00001"
This command selects an input tray and an output tray. This command is effective from the next "paper feed start" command and on the following "paper eject start" command. The argument can be omitted if the print engine 3 selects the same tray again. In this case, the previous tray selection is effective.

11. Mode setting "***00010"
This command sets the various modes for each optional unit. The argument can be omitted if the print engine 3 sets the same mode. In this case, the previous setting mode is effective.

12. Paper size setting "***00011"
This command notifies the currently selected input tray, output tray and duplex unit of the paper size information. If an optional input unit can detect paper size for all input trays thereof, it is not necessary to send this command. The argument can be omitted if the print engine 3 sets the same paper size. In this case, the previous paper size code is effective.

13. Paper feed start "***00100"
This command instructs the currently selected input unit or duplex unit to start feeding a sheet of paper to the registration position of the print engine 3.

14. Paper feed stop "***00101"
This command instructs each optional input unit or each optional duplex unit to stop feeding paper. The print engine 3 issues this command when the leading edge of a sheet passes through the registration sensor RS of the print engine 3. After receiving this command, the optional unit continues to feed all sheets of paper in the path for a predetermined distance (predetermined time) and then stops paper feed.

15. Paper feed restart "***00110"
This command instructs each optional input unit or each optional duplex unit to restart feeding sheets of paper which have stopped in the paper path of the optional unit. Stopped sheets are those which were fed initially by the "feed start" command and were stopped in the path by the "feed step" command. Therefore, this command is effective only for sheets whose feed is initiated by the "feed start" command.

16. paper eject start "***01000"
This command instructs each optional output unit or each optional duplex unit to start ejecting a sheet of paper from the print engine 3. The print engine 3 issues this command every time a sheet of paper is to be ejected. The argument can be omitted if the print engine 3 inquires paper eject start without paper ID information. No previous argument is effective for this command, and the optional unit recognizes that there is no paper ID information when it receives only an operator.

17. Paper eject end "***01001"

This command instructs each optional output unit or each optional duplex unit to finish ejecting a sheet of paper. It is not necessary for the print engine 3 to issue this command every time a sheet of paper is ejected during continuous printing.

18. Initialization "***01110"

This command initializes the optional units.

19. Abort "***01111"

This command urgently stops paper transport within the optional units and sets every actuator thereof to the initial position.

20. Length of print engine path "***01010"

This command notifies each optional unit of the length of the print engine paper path. For an input unit, the distance is measured from the engine entrance position for the currently selected tray to the registration position of the print engine 3. For an output unit, the distance is measured from an exit sensor position ES of the print engine 3 (FIG. 12) to the engine exit position for the currently selected tray. The argument can be omitted if the print engine 3 issues the same length. In this case, the previous length is effective.

21. Registration distance "******01011"

This command notifies each optional unit of the length of paper path from the registration sensor position RS to the registration stop position ES within the print engine 3. This length indicates the distance between the actuation position where the print engine 3 issues the "paper feed stop" command and the registration position where the optional unit should stop feeding the sheet of paper. The argument can be omitted if the print engine 3 issues the same length. In this case, the previous length is effective.

22. Transport velocity "***01100"

This command notifies each optional unit of the velocity of paper transport mechanism within the print engine 3. The argument can be omitted if the print engine 3 sets the same velocity. In this case, the previous velocity is effective.

Enhanced Commands

23. Assign device ID "***11001"

The print engine 3 can reassign device ID codes to logical ID codes and can change the system configuration using this command.

24. Inquire assigned device ID "***11010"

The print engine 3 can confirm device ID code numbers which are currently assigned to each logical ID code number using this command.

25. Inquire device ID "***11011"

The print engine 3 can confirm all device ID code numbers of all unit types which are currently in a communication active state by using this command.

The above-mentioned commands are executed in real time by the optional units. Each optional unit retains modes, status or assignment which was specified the tray selection, mode setting, paper size setting, length of print engine path, registration distance, transport velocity and assign device ID until the mode, status or designation is re-selected by these commands.

The correct format for a command is to send the argument first and the operator second. As described previously, an argument can be omitted for commands consisting of "argument" and "operator". Optional units also recognize "non-argument" command accurately. If an "argument+operator" command ("request unit status" command, for example) is issued without an argument by the print engine 3, the previous argument of the same command for the same logical ID unit is effective as a virtual argument. This is except for the "paper eject start" command, "assign device ID" command and "request device ID" command. The previous argument cannot be effective for the "paper eject start" command, "assign device ID" (FIG. 15(b)), and "request device ID" command (FIG. 15(d)). If no effective argument exits for an optional unit on receiving a command, the optional unit adopts default values as the virtual argument.

A response is a message which is sent from every optional unit to the print engine 3 and indicates receipt of a command. Every response is one byte in length with the most significant bit $b_7$ set to "0". If an optional unit does not support the received command, the optional unit returns [$7F_{hex}$], "01111111", as a response.

FIG. 15(b) shows the format of "assign device ID" command which is sent by the print engine 3 when it assigns a device ID code to an logical ID code. Further, FIG. 15(b) shows the format of a response which is sent from the optional unit on receiving the "assign device ID" command. The assigned device ID code is set in the least significant bits $b_3$ to $b_0$ of the argument and the logical ID code is set to the most significant bits $b_7$ to $b_5$ (shown by ***) of the operator.

For example, "assign device ID" command of "111x0010, 00011001" means an instruction of "assign device ID code "0010" (INP#3: large-capacity paper feed unit 17, 5B) to logical ID code "000" (IN#1)". The CPU 601 of the optional unit having device ID code "0010" (large-capacity paper feed unit 17 for this example) interprets the above-mentioned "assign device ID" command, and returns response "00000010" having the meaning that device ID code "0010" has been assigned as logical ID code "000" (IN#1). Although there is no unit type code in the device ID code, two bits $b_6$ and $b_5$ form a unit type code. In this example, "00" shows the optional input units.

FIG. 15(c) shows a device ID code which has been assigned to a specific logical ID code, that is, a command for inquiring a communication active optional unit, "inquire assigned device ID" command, as well as its response. This command has no argument. For example, "inquire assigned device ID" command "00011010" is a command which inquires of each optional unit what is assigned in logical ID code "000" (whether communication is available). If the optional unit having the assigned device ID code is the large-capacity paper feed unit 17, it returns response "00000010", which indicates that optional input unit "0010" has been assigned to IN#1 of the logical ID code.

FIG. 15(d) shows the "inquire device ID" command for inquiring whether an optional unit is in the communication active state, and its response. Bits $b_3$ to $b_0$ of the argument of this command is given the device ID code to be inquired, and bits $b_7$ and $b_6$ therefore given the unit type code thereof. For example, "111x0010, 00x11011" is a command for inquiring of optional input unit "0010" (large-capacity paper feed unit 17) whether communications are available. If the large-capacity paper feed unit 17 is in the communication active state, it sends back a response of "000x0010 to the print engine 3.

Now, the aforementioned global ID commands are further described. The global ID commands are commands in which bits $b_7$ to $b_5$ of the operator thereof is "110", which is a global ID address. When a global ID command is sent by the print engine 3, all optional units in the communication active state execute this command with the highest priority. All the optional units are inhibited from issuing responses for the global ID command. The print engine 3 can issue the next command without waiting for any responses.

INITIAL SET UP

Figure 16:
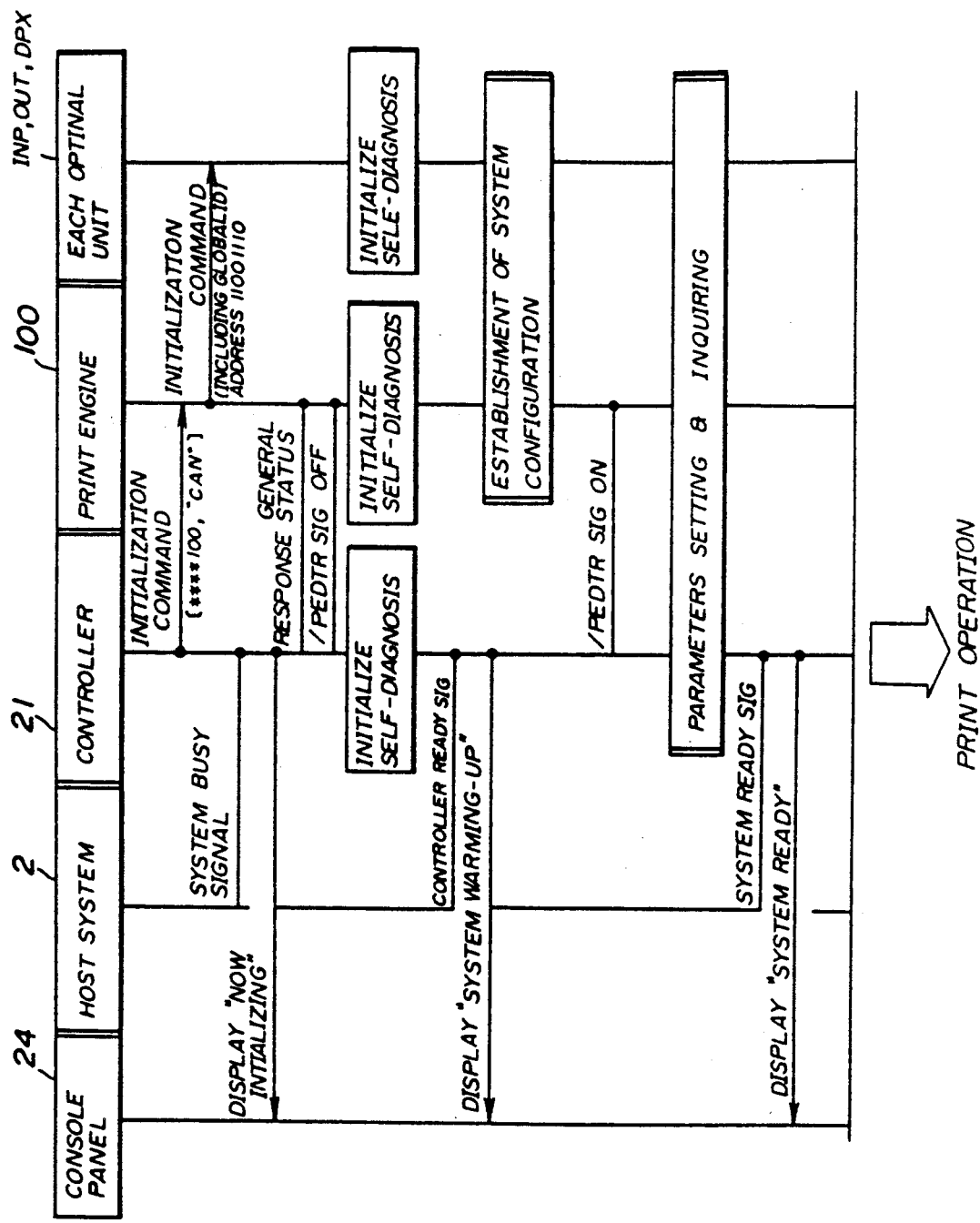
FIG. 16 is a flowchart of a procedure executed when power on and initializing the system.
Figure 17:
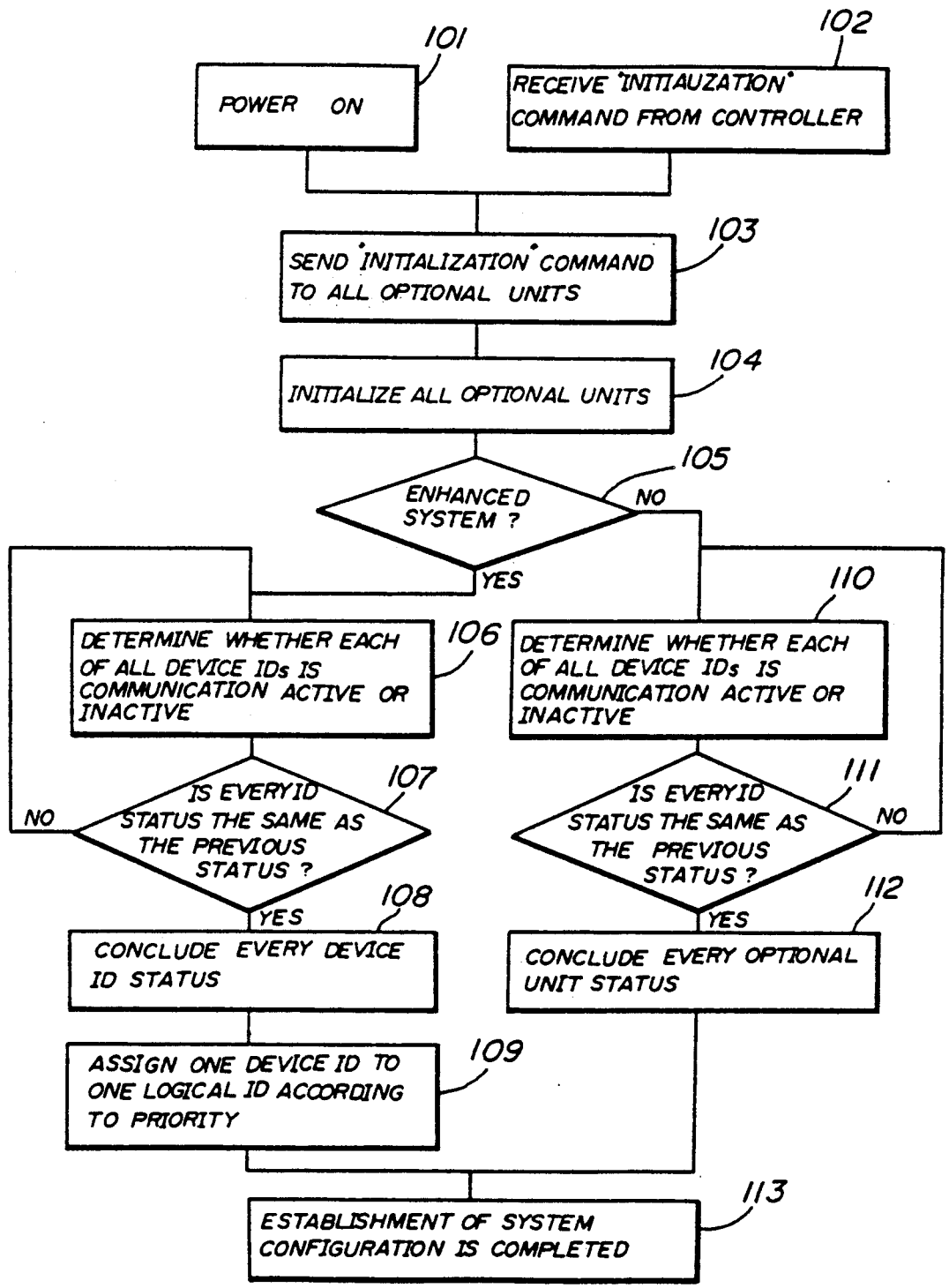
FIG. 17 is a flowchart illustrating an operation of the system in accordance with the procedure shown in FIG. 16.

A description is given of an initial set up with respect to FIGS. 16 and 17.

FIG. 16 relates to transmission performed when initializing. FIG. 16 is a diagram of a sequence of signal transmission between the console panel 25, the host system 1, the controller 2, the print engine 3 and each optional unit INP, OUT, DPX. FIG. 17 is a flowchart of an operation of the print engine 3 during initial set up.

When the print engine 3 is powered ON (step 101 in FIG. 17) or the print engine 3 receives the aforementioned "initialization" command supplied from the controller 2 (step 102), the print engine 3 sends the "initialization" command to all the optional units (step 103). The "initialization" command may have an operator of "11001110" which includes a global ID address "110". The print engine 3 is initialized by executing the self-initialization and self-diagnosis. On the other hand, all the optional units which are in the communication active state and receive the "initialization" command from the print engine 3, are initialized by executing self-initialization and self-diagnosis (step 104).

Thereafter, the print engine 3 determines whether the present printer system is an enhanced system (step 105). If the result in step 105 is YES, the printer system is an enhanced system, and therefore the print engine 3 determines, two times or more, whether all device ID codes (a maximum of 48 device ID codes) are in the communication active state or the communication inactive state (step 106). Then the print engine 3 discerns whether the status of each of the device ID codes is the same as the previous status (step 107). When the status of each of the device ID codes is the same as the previous status, the print engine 3 includes the status of each of the device ID codes. It is to be noted that the above-mentioned procedure which is carried out two times or more, intends to prevent the print engine 3 from mistakenly concluding the status of each of the optional units which are in an unstable state (transient state). Thereafter, one device ID code is assigned to one logical ID code in the order of priority (step 109). When the procedure in step 109 is completed, the system configuration is established (step 113).

The priority defined in the present embodiment consists of priority #1 and priority #2.

Priority #1: communication active unit
Priority #2: younger device ID code

On the other hand, when the result in step 105 is NO (that is, the printer system is not an enhanced system but a basic system), the print engine 3 discerns whether all the logical ID units (5IDs) are in the communication active state for at least two times (step 110). When the status of each logical ID unit is the same as the previous status, the print engine 3 concludes the status of each optional unit (step 112), and completes the establishment of system configuration (step 113). It is noted that the print engine 3 is inhibited from issuing a command to the optional units during its own initialization. It is further noted that each optional unit is inhibited from sending a response to the print engine 3 during its own initialization.

After the system configuration is established, the print engine 3 is permitted to communicate with the controller 2. As shown in FIG. 16, the print engine 3 maintains the aforementioned "/PEDTR" signal (communication ready signal) high (communication inhibited; OFF) until the completion of the establishment of system configuration. The /PEDTR signal ("/" denotes a low-active signal) is a ready signal for transmission of command. When this signal is low, the controller 2 is allowed to send a command to the print engine 3. The print engine 3 maintains this signal low during power on or initialization (including the establishment of system configuration).

FIGS. 18A, 18B, 19A, 19B, 20A and 20B show a communication procedure which is used when the controller 2 requires to know the status of the print engine 3 and a specific optional unit. FIGS. 21A and 21B illustrate the contents of a print engine status code which is a response from the print engine 3. FIGS. 22A and 22B illustrate the contents of an option input/output unit status code.

Figure 18B:
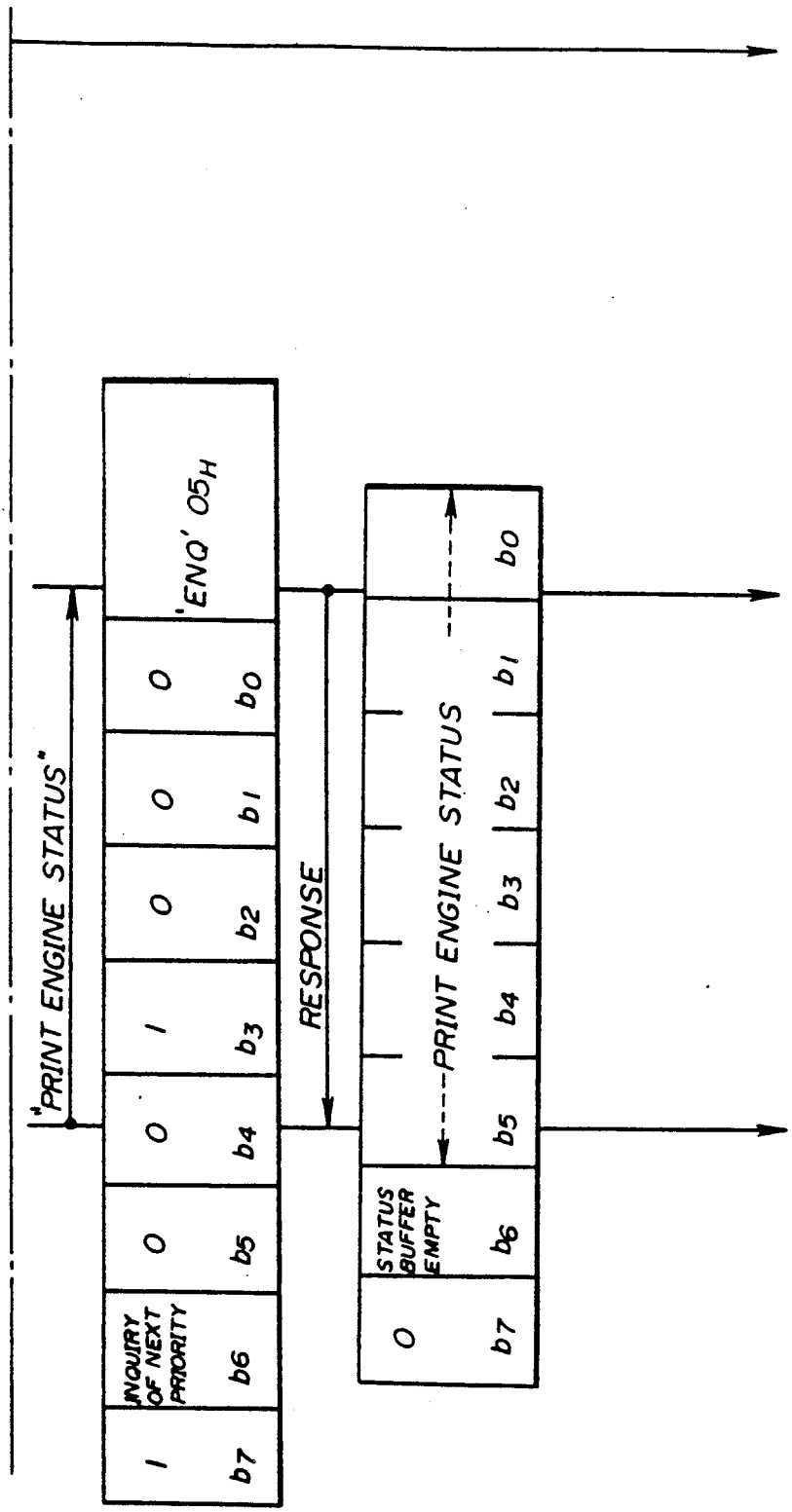
Figure 19A:
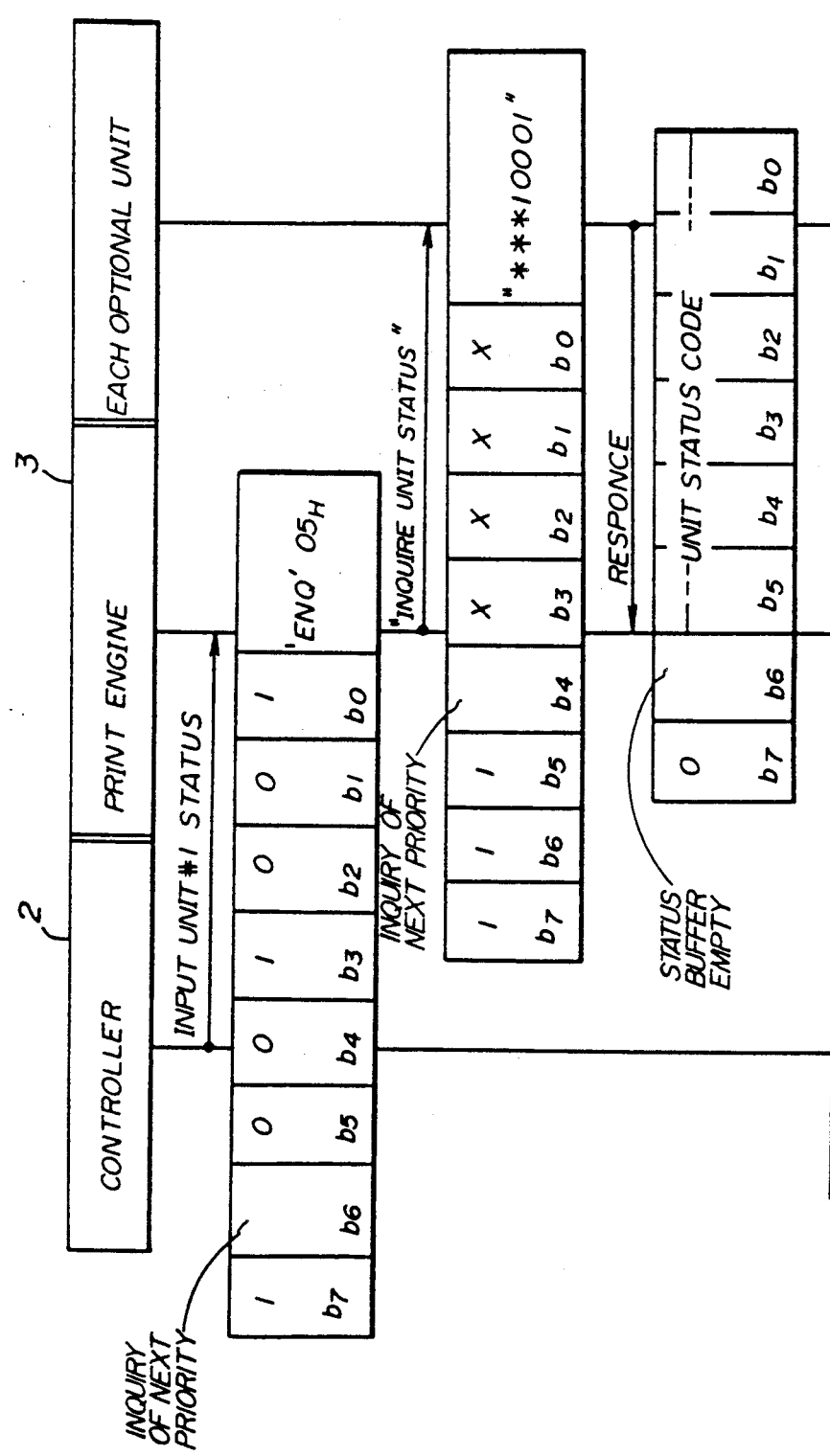
FIGS. 19A and 19B are diagrams of a procedure for transmitting commands and responses when the controller confirms the states of the print engine and each optional unit.
Figure 19B:
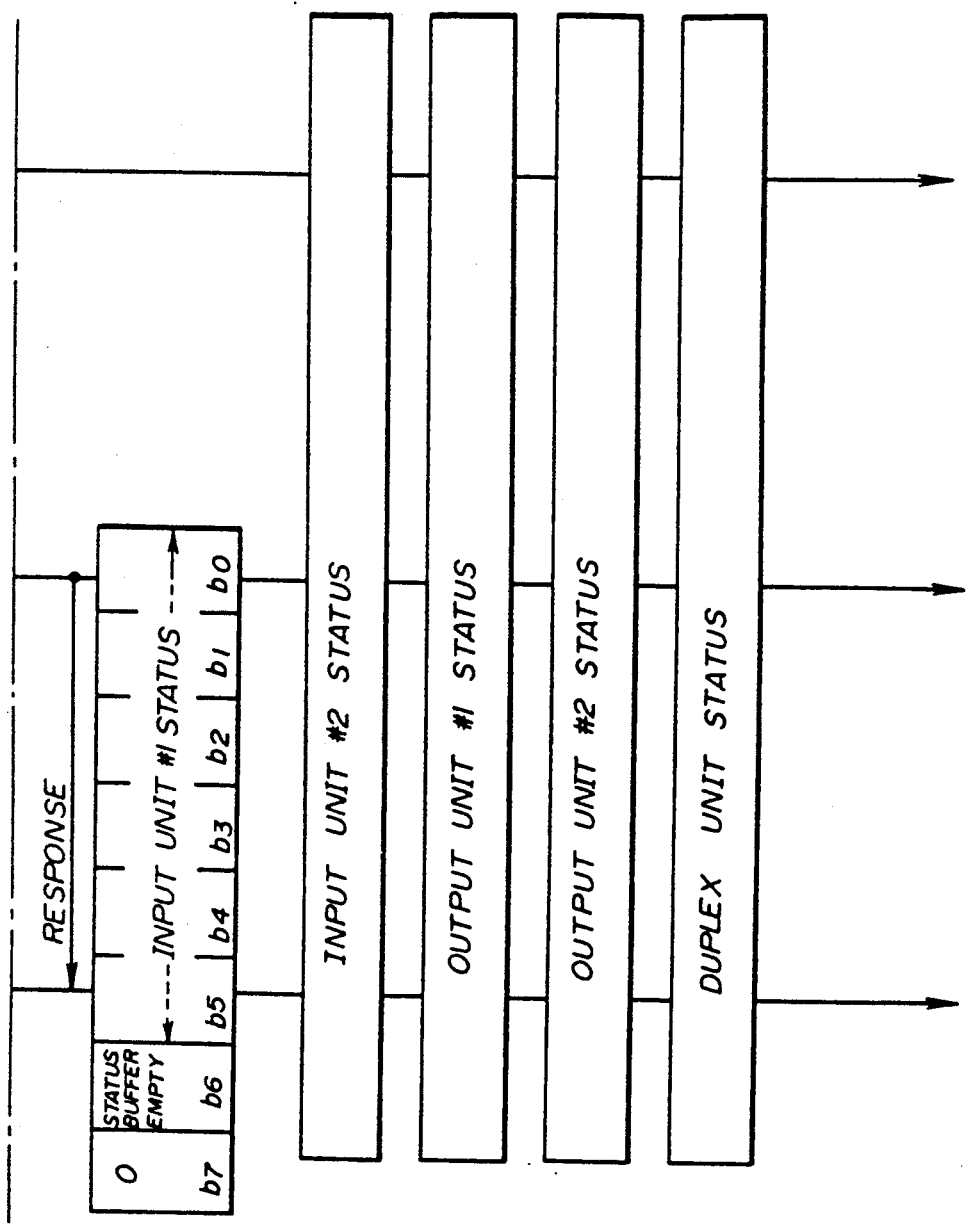

A description is given of communication between the controller 2 and the print engine 3. Referring to FIGS. 18A and 18B, the controller 2 sends the print engine 3 the "status request" command which inquires the general status of the print engine 3 Bits $b_0$–$b_6$ of this command are all set to zero. When receiving the "status request" command, the print engine 3 sends back the corresponding response to the controller 2, in which values of bits $b_0$–$b_6$ of the response indicate the general status of the print engine 3.

Next, the controller 2 sends the print engine 3 the "print engine status" command which inquires the status of the print engine 3. If bit $b_6$ of this command is "0", the print engine 3 sends the controller 2 information having the highest priority among the status of the print engine 3 having the corresponding priority levels. As is shown in FIGS. 21A and 21B, a priority level of '64' is the highest, and a priority level of '0' is the lowest. If there is no information to be sent back to the controller 2, a response is returned in which bit $b_6$ is set to "1" and bits $b_5$–$b_0$ are indefinite.

When bit $b_6$ of the response is "1", the controller 2 stops inquiring of the print engine 3 the status thereof, and shifts to a procedure for inquiring of the next unit of its status. When bit $b_6$ of the response is "0", in the status buffer of the print engine 3 there is still status information which is to be inquired by the controller 2. Thus, the controller 2 sends the print engine 3 the "status request" command again. At this time, unless bit $b_6$ of the command is set to "1", information having the highest priority is returned again. Thus, in order to inquire of the print engine 3 of the status having the second highest priority, the controller 2 sends the command having bit $b_6$ set to "1". Thus, the controller 2 can get the status having the second highest priority. The controller 2 repeatedly inquires of the print engine 3 the status until the bit $b_6$ becomes "1". In the above-mentioned manner, the controller 2 an the present status of the print engine 3.

As shown in FIG. 21A and 21B, the status code has the contents which are defined between the print engine 3 and the controller 2 in the form of table. After inquiring of the print engine 3 the status thereof, the controller 2 inquires of the print engine 3 the status of each of the optional units. For example, the controller sends the print engine 3 the "inquire status request" command directed to the optional input unit #1. In this case, the command has bits $b_5-b_0$ set to "001001". When receiving this command, the print engine 3 sends the optional input unit #1 the "inquire unit status" command, and then receives the response. This command has a bit ($b_6$) which indicates whether or not information on the order of priority over the optional units should be inquired as in the case of command transferred between the controller 2 and the print engine 3. The response has a bit ($b_6$) which indicates whether the status buffer for storing status information is empty. The controller 2 inquires of the print engine 3 the status of the optional input unit #1 until the controller 2 is informed that the status buffer becomes empty.

As shown in FIGS. 22A and 22B, the status code which is sent back as a response has the contents which are defined among the print engine 3, the controller 2 and each optional units in the form of table. The print engine 3 sends the status information obtained from the optional unit unit #1 to the controller 2 as the response.

In the same manner, the controller 2 inquires of the print engine 3 the status information on the input units #2, the output unit #1, the output unit #2 and the duplex unit.

Figure 23:
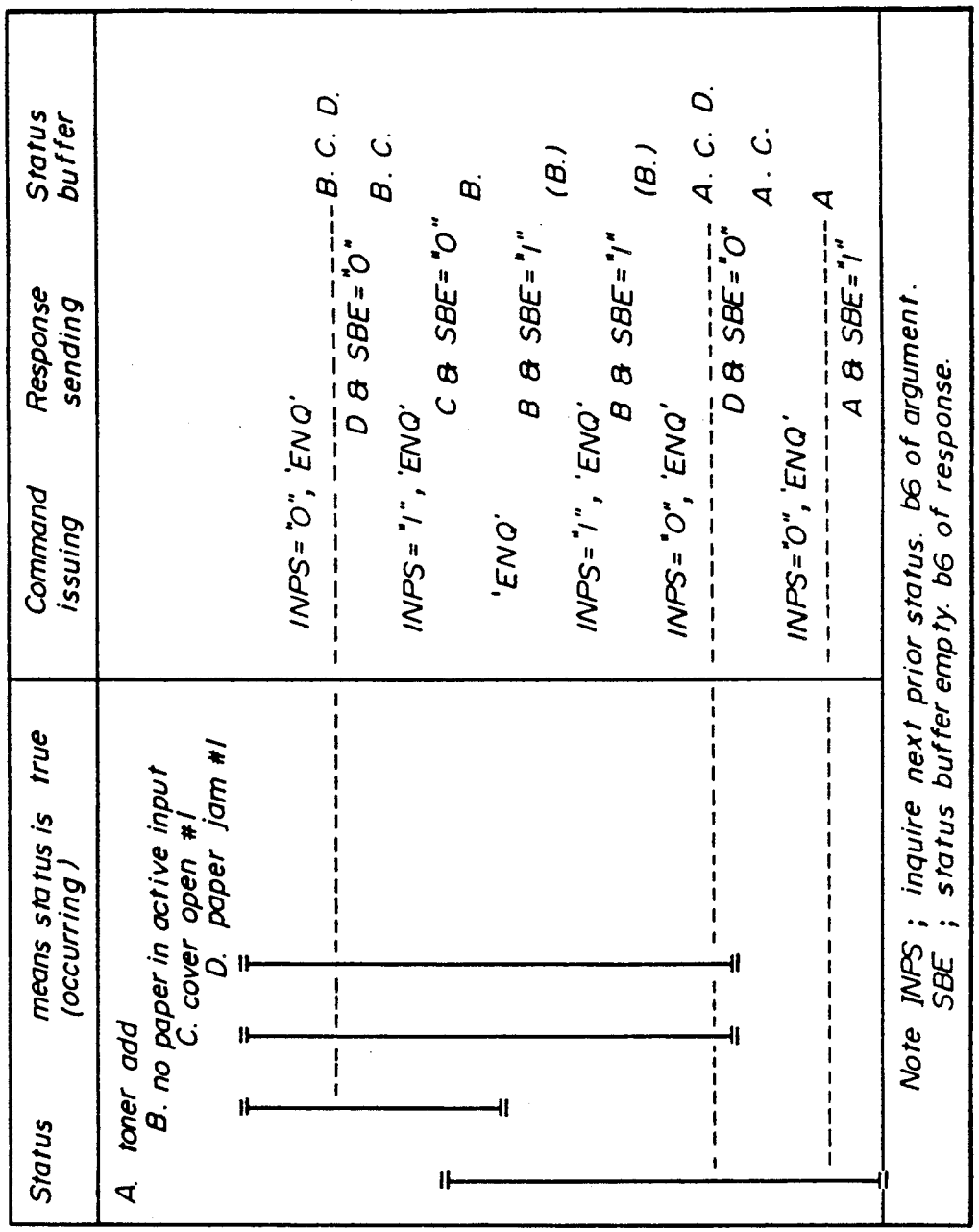
FIG. 23 is a diagram illustrating an example of a response to the command for inquiring the status of the print engine.
Figure 27B:
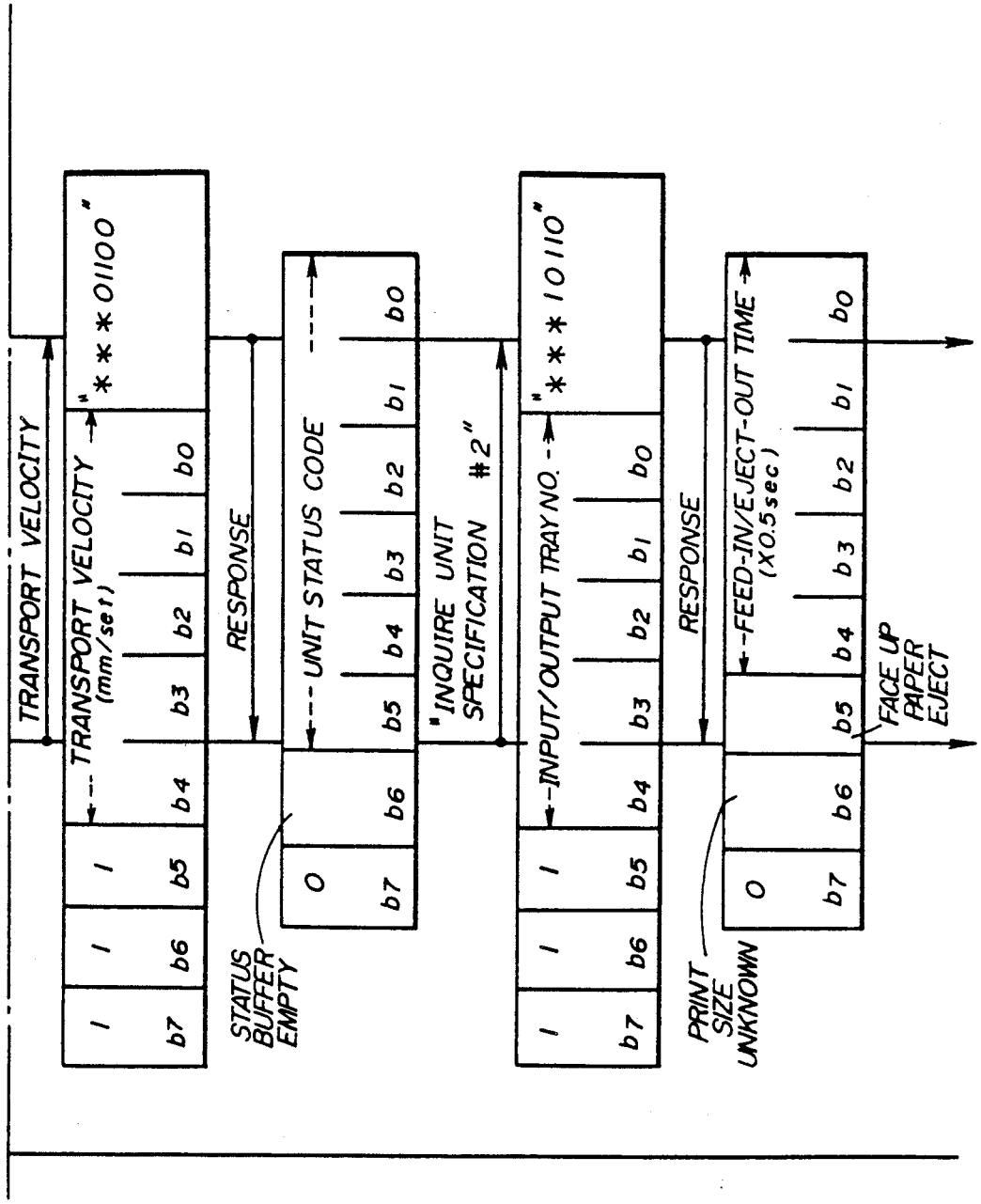

FIG. 23 illustrates an example of the response relating to the engine unit status. The illustrated example supposes the following case. Short of paper (B), cover open #1 (C), and paper jam #1 (D) simultaneously occur in the paper feed tray in use. Thereafter, shortage of toner (A) occurs and then short of paper (B) is recovered. After that, the above-mentioned events (C) and (D) are recovered at the same time, and then the event (A) is recovered. The priority of status of the events is in the order of (D), (C), (B) and (A). In FIG. 23, 'ENQ' denotes the "status request" command for inquiring the status of the print engine 3, INPS is bit $b_6$ of the argument of the command (when the bit is "1", the order of priority is inquired), and SBE is bit $b_6$ of the response (when the bit is "1", the status buffer is empty).

A description is given of the "printer general status" command and its response. This command has the operator 'ENQ' (05H in hexadecimal notation), and is therefore represented as $80_H$'ENQ'. This command is one of the aforementioned "status request" commands, and is used to inquire the general status of the print engine 3 including the status of the optional units.

Each bit of the response indicating the status supplied from the print engine 3 to the present command is as follows.
Response (status):
$b_7$: "0"
$b_6$: paper exists in the system paper path
$b_5$: ejected paper ID exists in ejected paper ID buffer
$b_4$: paper jam confirmed
$b_3$: print start ready (registration point ready)
$b_2$: feed started (on feeding)
$b_1$: status group code 1
$b_0$: status group code 0
The following notes are given this command.

(1) Paper exists in the system paper path:
When any sheets of paper, which have already started feeding from any input tray (except duplex unit) and which have not yet been ejected to any output tray (except duplex unit), exist in the paper path (including duplex unit) of the print engine 3, the flag of bit $b_6$ is set to "1". If no sheets of paper exits in the paper path of the print engine 3, the flag is set to "0".

(2) Ejected paper ID exists in the ID buffer:
The flag of bit $b_5$ is set to "1" when a sheet of paper has been completely ejected to any output tray except for the duplex unit. The flag is set to "0" when ejected paper ID buffer becomes empty after event report #3 has been issued or after the response to the 'ACK' command has been issued. The flag remains "1" if there are still ejected paper ID codes in ejected paper ID buffer, or in other words when the ejected paper ID buffer is not empty.

The controller 2 can inquires the ejected paper ID code by issuing the "inquire ejected paper ID" command, that is 'ACK'

(3) Paper jam confirmed:
In some cases, even if a paper jam has occurred in the print engine 3 while printing, sheets other than the jammed paper may continue transportation and be ejected to the output tray. The paper jam is confirmed only after the other sheets have been ejected The print engine 3 sets this flag to "1" when the paper jam has been confirmed as described as above.

The controller 2 can inquire the jammed paper ID number by issuing the "status request" command when the flag is "1".

The print engine 3 sets the flag to "0" when the print engine 3 recognizes that there is no paper remaining in the paper path after jam recovery.

(4) Print start ready:
The flag of bit $b_3$ is set to "1" when a sheet arrives at the registration position. The flag is set to "0" when there is no paper at the registration position. When this flag is set to "1", the print engine 3 will start printing after receiving 'VT' command. The controller 2 may send the "print start" command in the correct print sequence without monitoring this flag.

(5) Feed started (on feeding)
This flag of bit $b_2$ is set to "1" when the print engine 3 starts to feed a sheet of paper. This flag is set to "0" when the print engine 3 is able to start feeding next sheet from "current active input tray". Timing of setting this flag to "0" depends on which tray is next current active.

(6) Status ground code:
The flags formed by two bits $b_1$ and $b_0$ indicate the general state of the print engine 3. The meaning of the flags are as shown in FIG. 24. Status indicated with status group code depends on event report enable condition. Therefore "status group code" state changes in compliance with $b_1$ and $b_0$ argument of the 'ETB' command. Details status indicated with status group code formed by bits $b_1$ and $b_0$ are shown in FIG. 25.

A description is given of an event report. In the present embodiment when a change in status of the printer system (print engine 3 and optional units) occurs, the print engine 3 can informs the controller 2 of the occurrence of the change through an event report which is an asynchronous message. A procedure for setting information on whether the controller 2 can send the print engine 3 an asynchronous message is done by sending the aforementioned command, "event report enable" command having the format of [argument+'ETB'] (FIG. 26A) from the controller 2 to the print engine 3. In this procedure, the signal /PERXD based on the interface LPVI is employed. Information on whether transmission of the asynchronous message is available is sent back, as a response, to the controller 2 from the print engine 3.

The "event report enable" command 'ETB' and its response are described with reference to FIGS. 26(A) and 26(B). This command enables or disables the print engine 3 to transmit each of the event reports.

Format: "argument" + 'ETB' [17hex]
argument;
$b_7$: "1"
$b_6$–$b_2$: event report number
$b_1$, $b_0$: event report enable condition
Response:
$b_7$: "0"
$b_6$–$b_2$: event report number
$b_1$, $b_0$: event report enable condition Default:
Default enable condition just after power up or initialization is that $b_1$–$b_0$ are "00" for all event report numbers. The print engine 3 is prohibited from sending any event reports.

It is preferable that the controller 2 confirms the result of the print engine diagnosis after initialization is completed. The print engine 3 does not issue any event reports due to the default setting of the 'ETB' command ($b_1$–$b_2$="00"). The controller 2 inquires the print engine status or enable event report after initialization.

As shown in FIG. 26A, changes in status of the print engine 3 are classified into 12 types, and event report numbers are given the respective types as identification numbers. Each event report number is allocated bits $b_6$–$b_2$ of the argument of the "event report enable" command. The event report enable/disable condition is allocated bits $b_1$ and $b_0$. Particularly, in the event report #4, an indication of transmission enable or disable is classified into the following four levels as shown in FIG. 25. Each of the other event reports is not classified into any levels, and an indication on transmission enable or disable is specified. By using these arguments, the controller 2 sends the print engine 3 the 'ETB' command and sets an instruction of whether transmission of event report is enabled or disabled.

When a change in status of the print engine 3 occurs, if transmission enable has been set, the print engine 3 sends the controller 2 this change of status represented by any of codes 80hex-FFhex through the signal /PETXD. The format of this event report consists of 8 bits as shown in FIG. 14(e).

A further description is given of event reports The print engine 3 stacks, as event reports, all changes in status of the print engine 3 in the event buffer, which occur as long as the event report enable condition is designated by the controller 2 through the 'ETB' command. Then the print engine 3 subsequently issues corresponding event reports when the signal /PECTS is active. A sufficient capacity of the event buffer depends on the scale of the print engine 3. A capacity equal to 20-30 events will be sufficient to form the event buffer.

Each of the event reports is describe below.

(A) Event report #0 (Feed and print event):
This event report is sent to the controller 2 when paper feeding has been started or when the paper is ready to print at the registration position.
Report:
$b_7$–$b_2$:"100000"
$b_1$:print start ready (ready at the registration position)
$b_0$:feed started (on feeding)
The print start ready flag ($b_1$) is set to "1" when a fed sheet is ready to print at the registration position. The print start ready flag is reset when no sheet of paper waits for printing at the registration position. This event report is issued at the moment of the print start ready flag is set to "1", but not be issued when the print start ready flag is reset. When this event report is issued because of "feed started", the print start ready flag is fixed on "0".

The feed started flag ($b_0$) is set to "1" when the print engine 3 starts feeding a sheet of paper. And the feed started flag is reset to "0" when the print engine 3 is able to start feeding next sheet from "current active input tray". Timing of resetting the feed started flag depends on what the next current active tray is. This event report is issued at the moment of the feed started is set, but not be issued when the feed started flag is reset. When this event report is issued because of "print start ready", the feed started flag is fixed on "0".

(B) Event report #4 (General status group code):
This event report is sent to the controller 2 when status of the print engine 3 changes.
Report:
$b_7$–$b_2$:"100100"
$b_1$:general status group code 1
$b_0$:general status group code 2
The "general status group code" flags ($b_1$, $b_0$) indicate the general state of the print engine 3. The meanings of the flags are as follows (refer to FIGS. 21 through 24).

TABLE

| $b_1$ | $b_0$ | error name |
|---|---|---|
| 0 | 0 | no error |
| 0 | 1 | caution |
| 1 | 0 | busy |
| 1 | 1 | error |

Status indicated with status group code depends on event report enable condition (refer to FIG. 25).

(C) Event reports #5, #6, #7, #8, and #9:
The event report #5 is an input unit #1 status group code, the event report #6 is an input unit #2 status group code, the event report #7, is a duplex unit status group code, the event report #8 is an output unit #1 status group code, and the event report #9 is an output unit #2 group code. These event reports are sent to the controller 2 only when the level of "status group code" on each optional unit has changed.
Report:
$b_7$:"1"
$b_6$–$b_2$ event report number
$b_1$:optional unit status group code 1
$b_2$:optional unit status group code 0
"Status group code" of each optional unit is the same as "optional unit general status".

(D) Event report #12 (Leading jammed paper ID)
This event report is sent to the controller 2 whether a jammed paper has been cleared, i.e., when "paper jam fixed" flag of "printer general status" changes from "0" to "1".
Report:
$b_7$–$b_4$:"1011"
$b_3$–$b_0$:leading jammed paper ID (refer to FIGS. 21A and 21B)

(E) Event report #16 (Tray condition of input tray)
This even report is sent to the controller 2 when any system input tray condition changes state between paper un-feedable state (paper end, tray unset, or tray cover open) and paper feedable state.
Report:

$b_7-b_4$:"1100"
$b_3$:"X" (reserved)
$b_2$:paper end/exist
$b_1, b_0$ input unit number When any input tray status of any input unit has changed from the paper feedable state to the paper end state, the present event report is sent in which bits $b_1$ and $b_0$ thereof are set to the input unit number and bit $b_2$ is set to "1". When any input tray status of any input unit has changed from above state to paper feedable state, bits $b_1$ and $b_0$ are set equal to the input unit number, and bit $b_2$ is set to "0".

(F) Event report #20 (Tray condition of input tray)

This event report is sent to the controller 2 when any output tray condition changes between the paper unejectable state (paper full state) and the paper ejectable state.
Report:
$b_7-b_4$:"1101"
$b_3$:"X" (reserved)
$b_2$:paper full/not full
$b_1, b_0$ output unit number When any of output tray condition of any output unit has changed from the paper ejectable state to the paper full state, this event report is sent in which bits $b_1$ and $b_0$ are set to the output unit number and bit $b_2$ is set to "1". When any output tray condition of any output unit has changed from the above state to paper ejectable state, this event report is set in a state where bits $b_1$ and $b_0$ are set to the output tray number and bit $b_2$ is set to "0".

(G) Event report #24 (Ejected paper ID)

This event report is sent to the controller 2 when a print cycle has just completed and a sheet of paper is completely ejected to the he specified output tray.
Report:
$b_7-b_2$:"1110"
$b_3-b_0$:ejected paper ID (H) Event report #28 (configuration change)

This event report is sent to the controller 2 when the system configuration has changed.
Report:
$b_7-b_4$:"1111"
$b_3$:communication active flag
$b_2-b_0$:logical ID code The communication active flag ($b_3$) is set to "1" when the optional unit which is assigned to the specified logical ID code is able to communicate accurately with the print engine 3. The communication active flag is set to "0" when the communication between the specified optional unit and the print engine 3 has become inactive due to power off or a communication break down. The present event report is issued for both transitions: from "0" to "1", and from "1" to "0".

The event report enable condition is as follows. For the event report #0, bit $b_1$ (1/0) serves as "print start ready" flag, and bit $b_0$ (1/0) serves as "paper feed start" flag. For the event report #4, bits $b_1$ and $b_2$ is as shown in FIG. 25. For the other event reports, bit $b_1$ is reserved, and bit $b_0$ (1/0) serves as the event report enable/disable flag.

As describe above, according to the present embodiment, the controller 2 sends a variety of status of the printer system (the print engine 3 and optional units) by the use of a single control command.

In order to know status of the printer system, the controller 2 sends the print engine 3 the "printer general status" command ($80_H$'ENQ') by using the 'PERXD' signal relating to the interface LPVI as shown in FIGS. 5 and 13. In response to this command, the print engine 3 sends back the controller 2 a corresponding response by using the signal /PETXD.

Before the controller 2 sends the "printer general status" command, using the signal /PERXD, the controller 2 may send the print engine 3 the aforementioned "event report enable" command (argument and 'ETB') which specifies a group of devices (print engine 3 and optional units) to which status information is reflected. In this case, status information on devices of the group is sent back to the controller 3 from the print engine 3.

A description is given of a procedure for designating a group of devices related to status information by the controller 2 when power on, by referring to FIG. 28. When the controller 2 is in the initial state, the controller 2 has a need for obtaining status of the printer system (the print engine 3 and optional units) For this purpose, after performing the internal initializing procedure (step 121), the controller 2 sets the enable condition (bits $b_1$ and $b_0$ of the argument) of the 'ETB' command to "11", and sends the same to the print engine 3 (step 122). After that, the controller 2 sends the print engine 3 the "printer general status" command $80_H$ "ENQ" (step 123), and inputs the printer general status (one information code indicating grouped information on current status; step 124). In this manner, the controller 2 obtains status information of the printer system. When the printer general status indicates the ready state (step 125), the controller 2 can execute a next procedure without inquiring status of each optional units. On the other hand, when the printer general status indicates status other than the ready status, the controller 2 inquiries of the print engine 3 the details of a cause which presents the ready status (contents of status of the status group code shown in FIGS. 21A and 21B), and then inputs the details (step 126). The controller 2 displays the details on the LCD display 250 shown in FIG. 7 (step 127).

Figure 29:
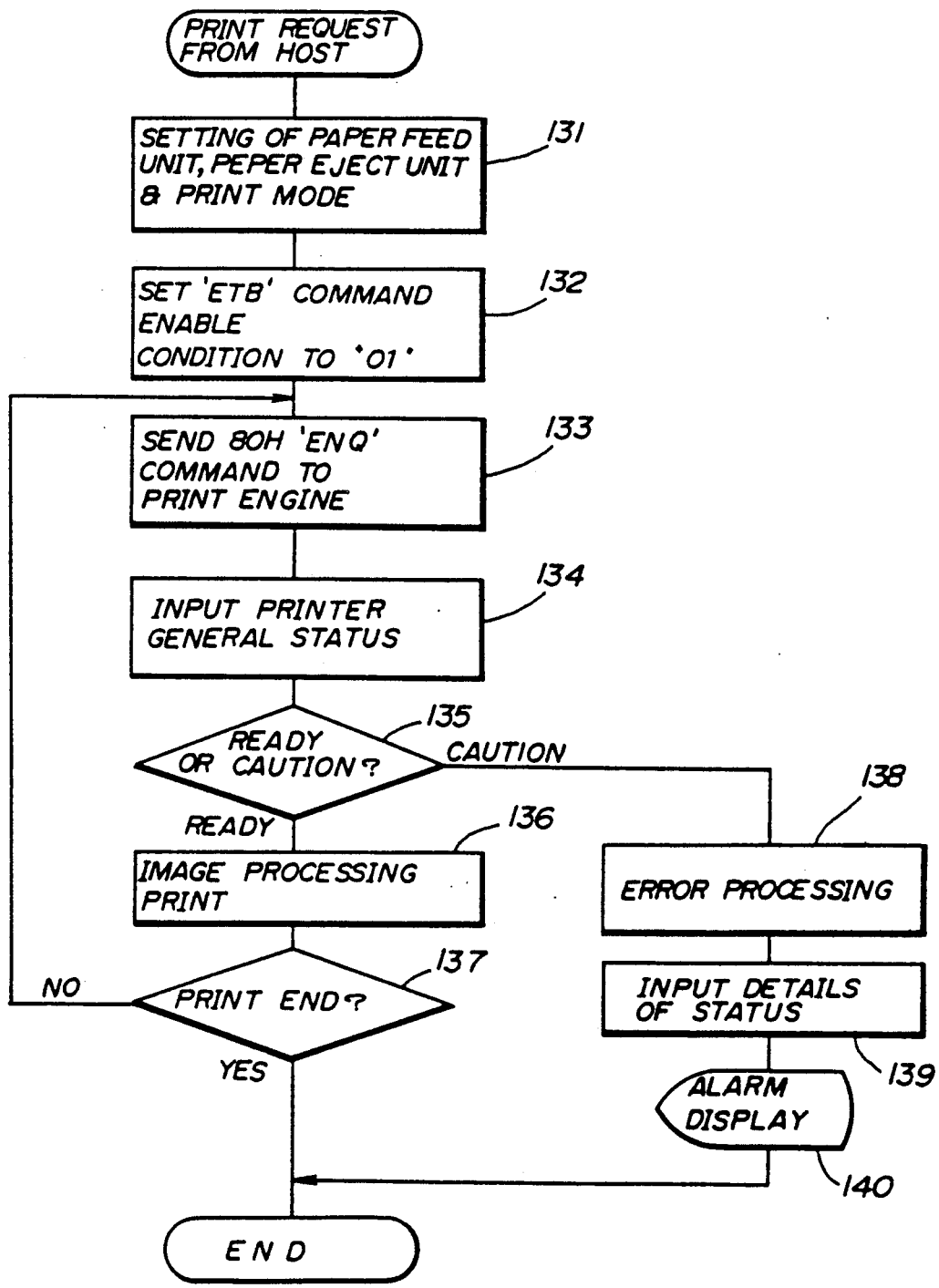
FIG. 29 is a flowchart of a procedure for designating a group of devices, status of which are inquired by the controller when the host system issues a print request.

A procedure which is executed during printing is described with reference to FIG. 29. When the host system 1 issues the print request, the controller 2 is activated through the procedure shown in FIG. 6. The print controller 203 reads out instructions for specifying a paper feed unit, a paper eject unit and print mode from the print control file 22g, and sets them in the print engine 3 (step 131). Once the paper feed unit, paper eject unit and the print mode are specified, in a system as shown in FIG. 12, optional units to be activated when printing are automatically determined. Thus, it is possible to ignore management of status of units other than the activated units used for printing. Therefore, the controller 2 sends the print engine 3 the 'ETB' command with bits $b_1$ and $b_0$ set to "01" (refer to FIG. 25; step 132). After that, the controller 2 sends the print engine 3 the "printer general status" command 80 'ETB' (step 133), and then inputs general status (group code) which indicates the status of only selected units (step 134).

When the printer general status is the ready condition or caution condition (step 135), image processing and printing is executed (step 136). When printing is completed (step 137), the procedure returns to step 133. On the other hand, when the result in step 135 is NO, an error processing which is required to be performed urgently is immediately carried out (step 138). For example, a busy signal is sent to the host system 1. Thereafter, the controller 2 inquiry of the print engine 3 the contents of error occurred in the system (step 138), and inputs the same (step 139). Then an alarm is displayed on the LCD display 250 (step 140).

The aforementioned procedures can be applied to a laser beam printer system as shown in FIG. 30 where a controller 2' is incorporated in a host system 1' and the host system 1' is coupled to the print engine 3 through the laser beam printer/video interface LPVI.

The present invention is not limited to the aforementioned embodiments, and variations and modifications may be made without departing from the scope of the present invention.

What is claimed is:

1. An image forming system comprising:
    an image processing device which receives information to be recorded and which generates image data from said information;
    an image forming device which receives said image data and forms an image defined by said image data on a recording medium;
    optional units detachably coupled to said image forming device and having at least one recording medium feed unit which feeds said recording medium and at least one recording medium eject unit which ejects said recording medium supplied from said image forming device; and
    status change notifying means, coupled to said image processing device, said image forming device and said optional units, for sending an asynchronous message to said image processing device immediately when a status change of a device selected from the group consisting of said image forming device and said optional units takes place.

2. An image forming system as claimed in claim 1, further comprising management table means for storing a group having possible status changes which may take place in said image forming device or said optional units, wherein:
    an identification number is assigned to each of said possible status changes;
    said identification number includes information indicating whether or not a corresponding one of said possible status changes should be sent to said image processing device; and
    said management table means specifies status changes from among said possible status changes which are to be sent, as said asynchronous message, to said image processing device.

3. An image forming system as claimed in claim 2, further comprising means for determining, when a status change takes place, whether or not said status change should be sent to said image processing device by referring to said management table means and for instructing said status change notifying means to send said asynchronous message when it is determined that said status change should be sent to said image processing device.

4. An image forming system as claimed in claim 2, wherein:
    said possible status changes are classified into a plurality of levels, each showing what data is to be contained in said asynchronous message;
    said identification number includes information identifying one of said levels; and
    said asynchronous message to be sent to said image processing means contains data indicated by a corresponding one of said levels to which said status change to be sent belongs.

5. An image forming system as claimed in claim 2, wherein:
    said possible status changes are classified into a plurality of levels, each showing what data is to be contained in said asynchronous message;
    said identification number includes information identifying one of said levels; and
    said asynchronous message to be sent to said image processing means contains data indicated by a corresponding one of said levels to which said status change to be sent belongs, and
    wherein said image forming system further comprises means for determining, when a status change takes place, whether or not said status change should be sent to said image processing device by referring to said management table means and for instructing said status change notifying means to send said asynchronous message containing data indicated by a corresponding one of said levels to which said status change to be sent belongs, when it is determined that said status change should be sent to said image processing device.

6. An image forming system as claimed in claim 2, wherein said image forming system is a laser beam printer system.

* * * * *

UNITED STATES PATENT AND TRADEMARK OFFICE
CERTIFICATE OF CORRECTION

PATENT NO. : 4,999,654

DATED : March 12, 1991

INVENTOR(S) : Fumitaka MARUO, et al.

It is certified that error appears in the above-identified patent and that said Letters Patent is hereby corrected as shown below:

Title page, left-hand column, section [21], change Appl. No.: from "435,629" to --435,628--.

Signed and Sealed this

Twenty-fifth Day of August, 1992

Attest:

DOUGLAS B. COMER

Attesting Officer

Acting Commissioner of Patents and Trademarks